(12) United States Patent
Goh et al.

(10) Patent No.: US 11,985,458 B2
(45) Date of Patent: May 14, 2024

(54) SYSTEM AND METHOD FOR BLUETOOTH® CLONING AND SWITCHING SYSTEM AMONG PLURAL PAIRED INPUT/OUTPUT DEVICES

(71) Applicant: Dell Products, LP, Round Rock, TX (US)

(72) Inventors: Peng Lip Goh, Singapore (SG); Eng Kang Chng, Singapore (SG); Suet Chan Law, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 196 days.

(21) Appl. No.: 17/733,268

(22) Filed: Apr. 29, 2022

(65) Prior Publication Data
US 2023/0353917 A1    Nov. 2, 2023

(51) Int. Cl.
H04R 1/00    (2006.01)
H04W 4/80    (2018.01)
H04W 84/18   (2009.01)

(52) U.S. Cl.
CPC ............... *H04R 1/00* (2013.01); *H04W 4/80* (2018.02); *H04W 84/18* (2013.01); *H04R 2420/07* (2013.01)

(58) Field of Classification Search
CPC .... H04R 1/00; H04R 2420/07; H04R 1/1041; H04W 4/80; H04W 84/18
USPC ......................................................... 455/500
See application file for complete search history.

(56) References Cited

U.S. PATENT DOCUMENTS

| | | | |
|---|---|---|---|
| 9,226,101 B1 * | 12/2015 | Ludwig | G06F 21/10 |
| 2016/0149749 A1 * | 5/2016 | Bunker | H04L 67/141 |
| | | | 709/217 |
| 2019/0394519 A1 * | 12/2019 | Yamakawa | H04N 21/8455 |

FOREIGN PATENT DOCUMENTS

EP         3687208 A2 *   7/2020   ........ H04W 12/0471

* cited by examiner

*Primary Examiner* — Eugene Yun
(74) *Attorney, Agent, or Firm* — Prol Intellectual Property Law, PLLC; H. Kenneth Prol

(57) ABSTRACT

A first wireless speaker and microphone device paired with an information handling system comprising a microphone, speaker, wireless radio system for conducting a first pairing with the information handling system for wireless communications, and memory for storing a pairing profile for the first pairing. A microcontroller to operatively couple the first wireless speaker and microphone device to a second wireless speaker and microphone device by conducting a second pairing between the first and second wireless speaker and microphone devices, and cloning and transmitting the pairing profile from the first pairing to the second wireless speaker and microphone device. The first wireless speaker and microphone device to receive a switching command to stop audio transmission and reception at the first wireless speaker and microphone device to allow transmission and reception at the second wireless speaker and microphone device using a cloned wireless link established with the cloned pairing profile.

20 Claims, 8 Drawing Sheets

SYSTEM AND METHOD FOR BLUETOOTH® CLONING AND SWITCHING SYSTEM AMONG PLURAL PAIRED INPUT/OUTPUT DEVICES

FIELD OF THE DISCLOSURE

The present disclosure generally relates to wireless speaker and microphone devices, such as earbuds and headphones. More specifically, the present disclosure relates to a system for automatically switching an active audio stream, such as a call between wireless speaker and microphone devices paired with a mobile information handling system, without the use of a user interface at the mobile information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, touchpad, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
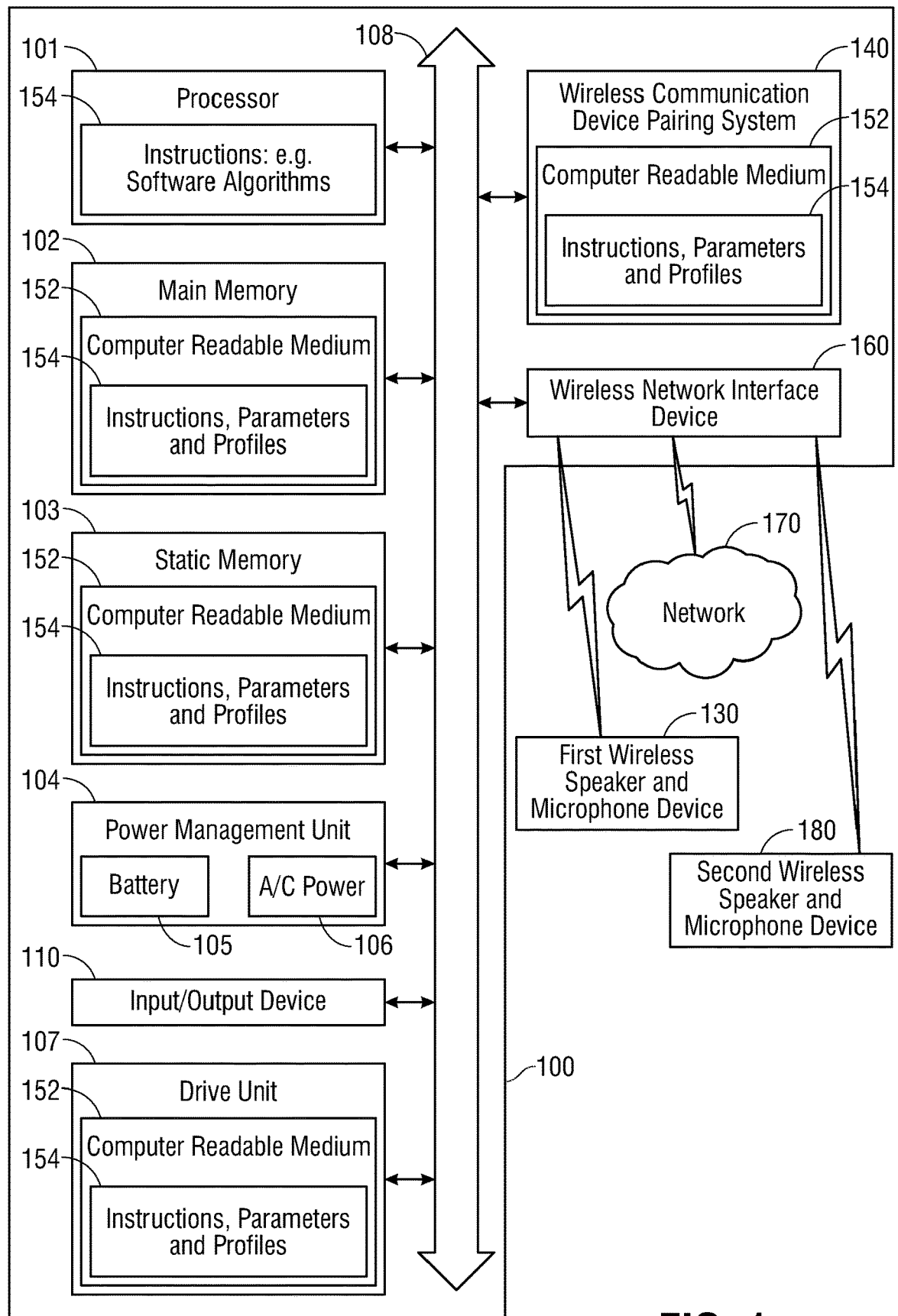
FIG. 1 is a block diagram illustrating an information handling system operatively coupled to plural wireless speaker and microphone devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of mobile information handling systems such as smart phones, tablets, or laptops may employ a plurality of wireless speaker and microphone devices (e.g., earbuds, headphones, smart speakers, laptops, tablets) located remotely from the mobile information handling system to transmit and receive streaming audio data such as streaming music, streaming podcasts, phone calls, or online meetings (e.g., through Zoom®, or Microsoft® Teams®). An active audio data stream may begin with the mobile information handling system or a first wireless speaker and microphone device (e.g., earbuds) acting as the primary point of input (e.g., via a microphone) and output (e.g., via a speaker) for the user. The user may wish to shift the active audio data stream to another wireless speaker and microphone device (e.g., smart speaker such as Alexa® Echo® or Google® Mini-Home®) as the primary point of input/output within the same active audio data stream.

Existing systems may require the user to perform one or more steps via a graphical user interface (GUI) at the mobile information handling system in order to handoff the active audio data stream between wireless speaker and microphone devices in such a way. This may be required due to the fact that the mobile information handling system recognizes each of the wireless speaker and microphone devices as a separate device having unique pairing profiles for the purposes of wireless communication. Thus, in order to switch between wireless speaker and microphone devices, the user may need to select, via a GUI, which wireless speaker and microphone device (and its corresponding pairing profile) to handoff the active audio data stream. In some cases, the user may also have to provide some form of input via one or more of these wireless speaker and microphone devices in order to perform such a handoff, such as initiating a pairing sequence at the wireless speaker and microphone device. Performing these steps via the GUI of the mobile information handling system or the wireless speaker and microphone devices in such a way may distract the user from the active audio stream (e.g., call, meeting, or session), and could result in failed pairings, dropped calls, or a pause or gap in the active audio data stream during switchover negatively impacting user experience. A solution is needed to allow users to handoff active audio data streams between multiple wireless speaker and microphone devices with minimal user input.

The Bluetooth® cloning and switching system in embodiments of the present disclosure address these issues by providing an automatic method for handing off active audio data streams such as calls, meetings, or sessions from one wireless speaker and microphone device to a second wireless speaker and microphone device without the need for user input at the mobile information handling system through which the active audio data stream was initiated. In embodiments of the present disclosure, one of the wireless speaker and microphone devices (e.g., earbuds) may initiate a first pairing for a first wireless link with the mobile information handling system by providing a pairing and wireless communication profile unique to the first wireless speaker and microphone device (e.g., earbuds) to the mobile information handling system (e.g., smart phone), prior to establishment of an active audio stream. The first pairing and first wireless link may be conducted under a Bluetooth® or Bluetooth Low Energy (BLE) wireless protocol. The Bluetooth® cloning and switching system operating at the first wireless speaker and microphone device may store in memory a copy or clone of the pairing and wireless communication profile provided to the mobile information handling system, and may transmit the cloned pairing and wireless communication profile to any additional wireless speaker and microphone devices (e.g., smart speaker) within communication range during an initial preset procedure via a pairing between, for example, the first wireless speaker and microphone device and a second wireless speaker and microphone device. The second wireless speaker and microphone device in embodiments may later establish a parallel, duplicate cloned wireless link under a Bluetooth® protocol with the information handling system using the cloned pairing and wireless communication profile uniquely identifying the first wireless speaker and microphone device.

Following such preset pairings between the first wireless speaker and microphone device and the mobile information handling system, between the first wireless speaker and microphone device and the second wireless speaker and microphone device, and between the second wireless speaker and microphone device and the mobile information handling system, a later active audio stream may be initiated at the mobile information handling system. In embodiments described herein, the active audio stream may be transceived with the first wireless speaker and microphone device via the first wireless link pursuant to the first pairing under either Bluetooth® protocol. The microphone and speaker of the first wireless speaker and microphone device in embodiments may operate to receive and transmit further audio data (e.g., recorded audio of the user via the microphone) with the mobile information handling system. In other embodiments, only received audio data may be transmitted across the first wireless link via the first pairing under the Bluetooth® protocol. The second wireless speaker and microphone device in embodiments may initiate a second, parallel, cloned wireless link to the mobile information handling system, without the microphone and speaker of the second wireless speaker and microphone device actively receiving or transmitting audio data with the mobile information handling system. In such a way, the second wireless speaker and microphone device may connect "silently" to the mobile information handling system without transceiving the active audio data stream or without allowing input or output of that active audio data stream at the microphone or speaker of the second wireless speaker and microphone device while the microphone and speaker of the first wireless speaker and microphone device are in use.

The user may initiate a switch instruction by providing some user input (e.g., touching a capacitive or resistive switch, pressing a button, providing voice input, moving a switch) at a second wireless speaker and microphone device (e.g., smart speaker) indicating a desire to make the second wireless speaker and microphone device the primary source of input (e.g., via a microphone) and output (e.g., via a speaker) for the active audio data stream. The Bluetooth® cloning and switching system operating at the second wireless speaker and microphone device (e.g., smart speaker) in embodiments described herein may consequently transmit a switch command to the Bluetooth® cloning and switching system operating at the first wireless speaker and microphone device (e.g., earbuds) to initiate switching audio transmission and reception of the active audio data stream to the second wireless speaker and microphone device and to cease audio transmission and reception at the first wireless speaker and microphone device. This switch command may be transmitted via a second pairing and wireless link from the second wireless speaker and microphone device to the first wireless speaker and microphone device. The second wireless speaker and microphone device may commence audio transmission and reception via the microphone and speaker of the second wireless speaker and microphone device. The first wireless speaker and microphone device may cease audio transmission and reception via the speaker and microphone of the first wireless speaker and microphone device.

Because the pairing and wireless communication profile provided by the first wireless speaker and microphone device matches the cloned pairing and wireless communication profile provided by the second wireless speaker and microphone device, the first and second wireless speaker and microphone devices may be indistinguishable to the mobile information handling system (e.g., smart phone) that established the active audio data stream. Thus, the second wireless speaker and microphone device (e.g., smart speaker) may commence audio transmission and reception via its local microphone and speaker via the third, cloned pairing via the parallel wireless link with the mobile information handling system without requiring the user to instruct the mobile information handling system to handoff the active audio data stream between two separate wireless speaker and microphone devices via a GUI at the mobile information handling system. In such a way, the Bluetooth® cloning and switching system operating at a plurality of wireless speaker and microphone devices in embodiments of the present disclosure may allow a user to switch between these wireless speaker and microphone devices as the primary source of input/output during an active audio data stream using the cloned pairing and wireless communication profile, without interacting with a GUI of the mobile information handling system.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 in an embodiment is operably coupled to one or more wireless speaker and microphone devices 130 and 180 capable of wirelessly receiving and transmitting audio data, such as a voice call or streaming audio content (e.g., podcast, music, etc.) via a link with the wireless network interface device 160. In some embodiments, the wireless speaker and microphone devices 130 or 180 may comprise a wearable hearing device that a user may position in or around the user's ears, such as earbuds or headphones. In other embodiments, the wireless speaker and microphone devices 130 or 180 may comprise a smart speaker system (e.g., Alex® Echo® or Dot®, or Google® Mini-Home® devices), or a tablet, desktop, or laptop computing device. Information handling system 100 may be any mobile information handling system, such as a smart phone, tablet, or laptop, used with a wireless speaker and microphone device 130 or 180.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, a static memory 103 or drive unit 107 or other components of an information handling system. The information handling system 100 may also include one or more buses (e.g., 108) operable to transmit communications between the various hardware components. Portions of an information handling system 100 may themselves be considered information handling systems 100 in the embodiments presented herein.

The wireless network interface device 160 in an embodiment may be capable of communication between the information handling system and network 170 (e.g., LAN, WLAN, WAN, WLAN) in some embodiments. Further, wireless network interface device 160 may be capable of communication with the paired wireless speaker and microphone device 130 using a wireless link established using Near Field Communication (NFC), or Bluetooth® technology such as Bluetooth® or Bluetooth Low Energy protocols, for example. The wireless network interface device 160 in an embodiment may transmit and receive information necessary to pair the wireless speaker and microphone device 130 with the information handling system 100, such as, for example, pairing or wireless communication profiles for the information handling system 100 and the wireless speaker and microphone device 130. Such pairing or wireless communication profiles may operate to identify the wireless speaker and microphone device 130 as a device authorized to transceive data with the information handling system 100, as well as information sufficient to identify the wireless speaker and microphone device 130, such as a Media Access Control (MAC) address, IP address. The pairing or wireless communication profiles in an embodiment may further store various types of information necessary to perform a handshake between at least one wireless speaker and microphone device 130 and the information handling system 100, such as various public keys, private keys, hashing algorithms, short-term keys, long-term keys, or encryption/decryption algorithms. Further, the network interface device 160 in an embodiment may establish a wireless link with the network 170 to conduct an active audio data stream from a remote source such as an ongoing call, virtual meeting, or audio streaming from an online audio streaming service.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a wireless communication device pairing system 140, operating system (OS) software, application software, BIOS software, or other software applications or drivers detectable by processor type 101.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

Information handling system 100 in an embodiment may be in communication, via a wireless network interface device, with a wireless speaker and microphone device 130 such as earbuds, headphones, smart speakers, tablets, laptops or desktop computing devices, as described in greater detail herein. The information handling system 100 in such an embodiment may operate on wired and wireless links to connect with the network 170 via a network Access Point (AP) or base station, as described in greater detail herein.

The network interface device 160 may provide connectivity of the information handling system 100 to one or more operatively coupled wireless input/output devices such as wireless speaker and microphone devices 130 or 180. For example, the wireless network interface device 160 may establish a first wireless link directly to the first wireless speaker and microphone device 130, another wireless link directly to the second wireless speaker and microphone device 180, or any number of additional wireless links to additional wireless speaker and microphone devices in an embodiment. Further, wireless links may be established among the wireless speaker and microphone devices 130 and 180. Such wireless links may be established pursuant to the Bluetooth® or Bluetooth Low Energy® (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless speaker and microphone devices (e.g., 130 and 180) paired to the PAN 170 using a Bluetooth® compliant pairing and wireless communication profile. The PAN 170 in such an embodiment may communicate data between the information handling system 100 and any paired wireless speaker and microphone devices (e.g., 130 and 180) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi_33 communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a wireless communication device pairing system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The wireless communication device pairing system 140 may utilize a computer-readable medium 152 in which one or more sets of instructions 154 may operate in part as software or firmware instructions executed on the information handling system 100. The instructions 154 may embody one or more of the methods or logic as described herein. For example, instructions relating to the wireless communication device pairing system 140, firmware or software algorithms, processes, and/or methods may be stored here. More specifically, instructions 154 may be executed by the processor 101 or other processing resources such as an embedded controller (EC) or other controller integrated circuit to pair the wireless speaker and microphone device 130 with the information handling system 100. Such instructions 154 may comprise transmitting pairing or wireless communication profiles for the information handling system 100 and receiving pairing or wireless communication profiles for the wireless speaker and microphone device 130. The instructions 154 may further operate to perform various types of handshakes or encryption/decryption using various public keys, private keys, hashing algorithms, short-term keys, long-term keys, or encryption/decryption algorithms stored in the shared pairing or wireless communication profiles. Via the network interface device 160, in an embodiment, the processor 101 or another processing resource such as an embedded controller (EC) or other controller integrated circuit may execute code instructions 154 of the wireless communication device pairing system 140 to establish a wireless link with the network 170 for active audio data streaming from a remote source such as a call, virtual meeting or an online streaming service.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the wireless communication device pairing system 140 may be stored in static memory 103, or the drive unit 107 on a computer-readable medium 152 such as a flash memory or magnetic disk in an example embodiment. More specifically, computer readable medium 152 in an embodiment may store pairing or wireless communication profiles for identifying the wireless speaker and microphone device 130 as a device authorized to transceive data with the information handling system 100, as well as information sufficient to identify the wireless speaker and microphone device 130, such as a Media Access Control (MAC) address, IP address. The pairing or wireless communication profiles in an embodiment may further store various types of information necessary to perform a handshake between the wireless speaker and microphone device 130 and the information handling system 100, such as various public keys, private keys, hashing algorithms, short-term keys, long-term keys, or encryption/decryption algorithms. Any of such pairing or wireless communication profiles established for the first wireless speaker and microphone device may be cloned and transmitted to any additional wireless speaker and microphone devices within communication range of the first wireless speaker and microphone device 130, such as the second wireless speaker and microphone device 180, via a wireless link such as a Bluetooth® pairing between the wireless speaker and microphone devices as described in greater detail herein.

After sharing of cloned pairing and wireless communication profiles in such a way in an embodiment, the information handling system 100 may begin transceiving an active audio data stream with the first wireless speaker and microphone device 130. Upon user selection of the second wireless speaker and microphone device 180 as the primary point of input/output for an audio data stream actively outputting at the first wireless speaker and microphone device 130, the second wireless speaker and microphone device 180 may begin transceiving the same active audio data stream via a parallel, cloned wireless link with the information handling system 100, established using the cloned pairing and wireless communication profile described directly above. The information handling system 100 may view the first and second wireless speaker and microphone devices (e.g., 130 and 180) as the same device, due to the cloned pairing and wireless communication profile being used to establish both parallel wireless links. As such, the audio data stream can be handed off between multiple wireless speaker and microphone devices (e.g., 130 and 180) seamlessly by switching which device actively transceives the audio data stream among the wireless speaker and microphone devices, and without intervention by the user at the mobile information handling system 100 (e.g., via a GUI).

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
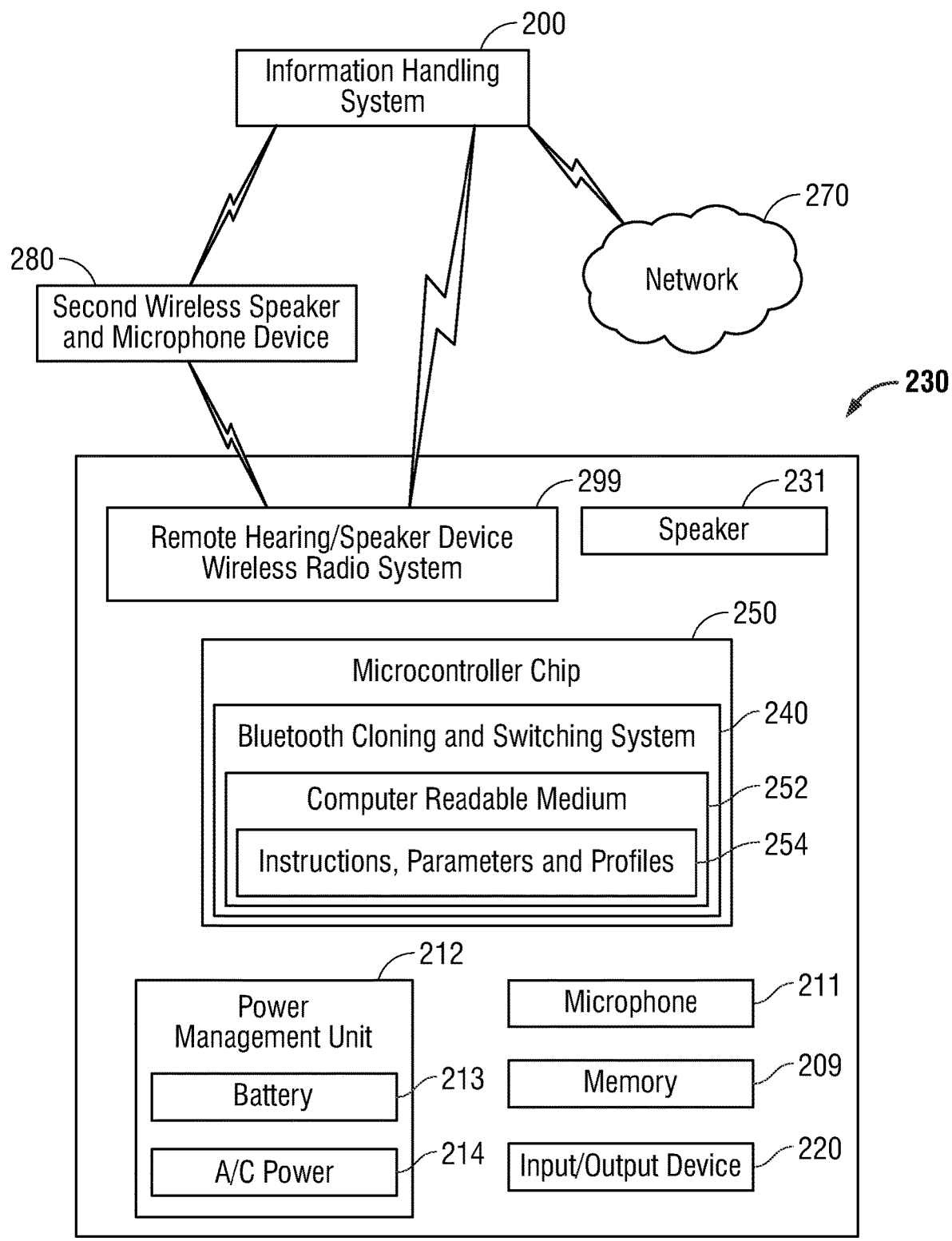
FIG. 2 is a graphical diagram illustrating a wireless speaker and microphone device according to an embodiment of the present disclosure.

FIG. 2 is a graphical diagram illustrating a wireless speaker and microphone device 230 operably coupled to the information handling system 200 according to an embodiment of the present disclosure. The information handling system 200 in an embodiment is operably coupled to a wireless speaker and microphone device 230 capable of wirelessly receiving and transmitting audio data, such as a voice call or streaming audio content (e.g., podcast, music, etc.) via a link with the speaker and microphone wireless radio system 299. In some embodiments, the wireless speaker and microphone device 230 may comprise a wearable hearing device that a user may position in or around the user's ears, such as earbuds or headphones. In other embodiments, the wireless speaker and microphone device 230 may comprise a smart speaker system (e.g., Alex® Echo® or Dot®, or Google® Mini-Home® devices), or a tablet, desktop, or laptop computing device. Such a wireless speaker and microphone device 230 in an embodiment may house a microphone 211 for recording a user's voice and a speaker 231 for outputting or playing audio data received from the information handling system 200 or the network 270 via the speaker and microphone wireless radio system 299. A power management unit 212 with a battery 213 or A/C power charging adapter 214 may be on the wireless speaker and microphone device 230 to provide power to the microcontroller chip 250, the speaker 231, the microphone 211, or other components of the wireless speaker and microphone device 230. An input/output device 220, such as a push button, a voice assistant, digital display, capacitive or resistive touch switch, or physical switch, for example, may allow the user to indicate a desire to hand an active audio data stream off to the wireless speaker and microphone device 230, or provide visible (e.g., light flashing a certain color) or audible feedback (e.g., alarm, buzzer, or voice indicator) to a user that an attempt to handoff the active audio data stream to the wireless speaker and microphone device 230 to the information handling system 200 has failed. In some embodiments, the second wireless speaker and microphone device 280 may be the same type of device as the first wireless speaker and microphone device 230. For example, both the first and second wireless speaker and microphone devices (e.g., 230 and 280 may comprise separate, individual sets of earbuds).

In an embodiment, the wireless speaker and microphone device 230 may include a microcontroller chip 250 that may be any device or devices that execute instructions, parameters, and profiles 254 of a Bluetooth® cloning and switching system 240 to facilitate automatic switching between a plurality of wireless speaker and microphone devices during an active audio data stream initiated at the information handling system 200. More specifically, instructions 254 may be executed by the microcontroller chip 250, for example a controller integrated circuit, to pair the wireless speaker and microphone device 230 with the information handling system 200 in a first pairing. Such instructions 254 may comprise transmitting pairing or wireless communication profiles for the information handling system 200 and receiving pairing or wireless communication profiles for the wireless speaker and microphone device 230. The instructions 254 may further operate to perform various types of handshakes or encryption/decryption using various public keys, private keys, hashing algorithms, short-term keys, long-term keys, or encryption/decryption algorithms stored in the shared pairing or wireless communication profiles. Via speaker and microphone wireless radio system 299, in an embodiment, the microcontroller chip 250 may execute code instructions 254 of the Bluetooth® cloning and switching system 240 to receive a known socket address or location, for example a Bluetooth® socket, at which the information handling system 200 may established an active audio data stream, and to establish a wireless link between the information handling system 200 and the first wireless speaker and microphone device 230 at the known address or location of that communication socket. Any or all of the above may be included in a pairing or wireless communication profiles relating to the first pairing between the first wireless speaker and microphone device 230 and the information handling system 200 in various embodiments. Such pairing and wireless communication profiles for the first pairing may be stored in a memory 209 at the first wireless speaker and microphone device 230.

In another aspect of an embodiment, instructions 254 may be executed by the microcontroller chip 250 to pair the wireless speaker and microphone device 230 with a second wireless speaker and microphone device 280. Such a second pairing between the first wireless speaker and microphone device 230 and a second wireless speaker and microphone device 230 may be conducted under a Bluetooth® wireless protocol in an embodiment. Such instructions 254 may further comprise transmitting to the second wireless speaker and microphone device 280 a clone of the pairing or wireless communication profiles previously exchanged during the first pairing of the information handling system 200 and the wireless speaker and microphone device 230. The instructions 254 may further operate to perform various types of handshakes or encryption/decryption using various public keys, private keys, hashing algorithms, short-term keys, long-term keys, or encryption/decryption algorithms to pair the first wireless speaker and microphone device 230 to the second wireless speaker and microphone device 280 to establish a second wireless link between the wireless speaker and microphone devices 230 and 280 to transmit the cloned pairing and wireless communication profiles of the first pairing. Via the speaker and microphone wireless radio system 299, in an embodiment, the microcontroller chip 250 may execute code instructions 254 of the Bluetooth® cloning and switching system 240 to also transmit pairing and wireless communication profile for Bluetooth® pairing such that the second wireless speaker and microphone device 280 may establish the a parallel, cloned wireless link to access the active audio data stream via the established, cloned wireless link between the second wireless speaker and microphone device 280 and information handling system 200 when a switch input is received from a user. When a switch instruction is received at the second wireless speaker and microphone device 280 from a touch button or other user input device, then the Bluetooth® cloning and switching system 240 may transmit a switch command to the first wireless speaker and microphone device 230 to terminate audio data streaming via the established wireless link between the information handling system 230 and the first wireless speaker and microphone device 230. With this switch instruction from the user and the first wireless speaker and microphone device 230 ceasing transmission and reception of audio streaming data and an acknowledgement received at the second wireless speaker and microphone device 280, the second wireless speaker and microphone device 280 via the established, cloned wireless link is configured for audio data stream and commences transmission and reception of the audio data stream on the parallel, cloned wireless link. In some embodiments, the microcontroller 250 may only execute such instructions 254 upon determining that the second wireless speaker and microphone device 280 is within communication range of the information handling system 200 or of the first wireless speaker and microphone device 230. This may be determined passively, because the microcontroller 250 may only execute the instructions 254 in such a way following receipt of an acknowledgement that the switching command from the second wireless speaker and microphone device 280 was received and executed at the first wireless speaker and microphone device 230. If the second wireless speaker and microphone device 280 is not within communication range of the first wireless speaker and microphone device 230 at the time of transmission, the first wireless speaker and microphone device 230 may not receive the command and provide the acknowledgement. If the second wireless speaker and microphone device 280 is not within communication range of the information handling system 200 at the time of transmission, the second wireless speaker and microphone device 280 may not be able to establish a parallel cloned wireless link with the information handling system and the microcontroller chip thereon will not issue a switch command to the first wireless speaker and microphone device 230.

The speaker and microphone wireless radio system 299 may provide connectivity of the first wireless speaker and microphone device 230 to other wireless speaker and microphone devices such as 280 and to the information handling system via one or more dedicated wireless links. For example, the speaker and microphone wireless radio system 299 may establish a first wireless link directly to the information handling system 200, a second wireless link directly to the second wireless speaker and microphone device 280, or any number of additional wireless links to additional wireless speaker and microphone devices in an embodiment. Such wireless links may be established pursuant to the Bluetooth® or Bluetooth Low Energy (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 270) in which the wireless speaker and microphone device 230 may communicate wirelessly with the information handling system 200 and any wireless speaker and microphone devices (e.g., 280) paired to the PAN 270 using a Bluetooth® compliant pairing and wireless communication profile. The PAN 120 in such an embodiment may communicate data between the information handling system 200 and any paired wireless speaker and microphone devices (e.g., 280) over short distances using Ultra High Frequency (UHF) radio waves in the Industrial, Scientific, and Medical purposes bands (ISM bands) between 2.402 and 2.48 GHz.

The speaker and microphone wireless radio system 299 in an embodiment may be capable of communication between the wireless speaker and microphone device 230, the information handling system 200, a second wireless speaker and microphone device 280. Further the information handling system 200 may be capable of communication with remote audio data streaming sources such as a call, virtual meeting, audio streaming service or the like via a network 270 (e.g., LAN, WLAN, WAN, WLAN) in some embodiments. Further, speaker and microphone wireless radio system 299 may be capable of communication with the paired information handling system 200 or other wireless speaker and microphone devices such as 280 using a wireless link established using Near Field Communication (NFC), or Bluetooth® technology, for example. The speaker and microphone wireless radio system 299 in an embodiment may transmit and receive information necessary to pair the wireless speaker and microphone device 230 with the information handling system 200 or the second wireless speaker and microphone device 280, such as, for example, pairing or wireless communication profiles for the information handling system 200 under the Bluetooth® or Bluetooth Low Energy (BLE) protocols. Such pairing or wireless communication profiles may operate to identify the first wireless speaker and microphone device 230 or the second wireless speaker and microphone device 280 (e.g., using a cloned pairing and wireless communication profile received from the first wireless speaker and microphone device 230) as a device authorized to transceive data with the information handling system 200, as well as information sufficient to identify the first wireless speaker and microphone device 230, such as a Media Access Control (MAC) address, IP address. The pairing or wireless communication profiles in an embodiment may further store various types of information necessary to perform a handshake between the information handling system 200 and the wireless speaker and microphone device 230 or the second wireless speaker and microphone device 280 (using cloned pairing and wireless communication profiles received from the first wireless speaker and microphone device 230), such as various public keys, private keys, hashing algorithms, short-term keys, long-term keys, or encryption/decryption algorithms. Further, the speaker and microphone wireless radio system 299 in an embodiment may establish a wireless link with the network 270 (e.g., Bluetooth® or Bluetooth PAN) to transceive streaming audio data, as described in greater detail herein.

The wireless speaker and microphone device 230 may, in some embodiments include a processor such as a central processing unit (CPU), a GPU, a Visual Processing Unit (VPU), or a hardware accelerator, microcontroller integrated circuits (e.g., 250) or hardware control logic or some combination of the same, such as when the wireless speaker and microphone device 230 is a laptop information handling system, earbuds, headphones, smart speaker or other device and those devices may have varying levels of processing resources. Any of the processing resources may operate to execute code that is either firmware or software code. Moreover, the wireless speaker and microphone device 230 may include memory such as memory 209, containing computer readable medium 252 storing instructions 254. Instructions 254 may include a Bluetooth® cloning and switching system 240, operating system (OS) software, application software, BIOS software, or other software applications or drivers detectable by processors or embedded controller 250. The instructions 254 in an embodiment may reside completely, or at least partially, within the memory 209.

Information handling system 200 in an embodiment may be in communication via the speaker and microphone wireless radio system 299 with the wireless speaker and microphone device 230 such as a wearable earbud hearing device or a wearable headset hearing device, as described in greater detail herein. The information handling system 200 in such an embodiment may operate on wired and wireless links to connect with the network 270 via a network Access Point (AP) or base station, as described in greater detail herein.

The present disclosure contemplates a computer-readable medium that includes instructions, parameters, and profiles or receives and executes instructions, parameters, and profiles responsive to a propagated signal, so that an information handling system such as 200 connected to a network 270 may communicate voice, video or data over the network 270. The wireless speaker and microphone device 230 may include a set of instructions 254 that may be executed to cause the computer system such as information handling system 200 or another wireless speaker and microphone device 280 to perform any one or more of the methods or computer-based functions disclosed herein. For example, instructions 254 may include a particular example of a Bluetooth® cloning and switching system 240, or other aspects or components. Various software modules comprising application instructions 254 may be coordinated by an operating system (OS), and/or via an application programming interface (API). Application instructions 254 may also include any application processing drivers, or the like executing on wireless speaker and microphone device 230.

The Bluetooth® cloning and switching system 240 on the wireless speaker and microphone device 230 may utilize a computer-readable medium 252 in which one or more sets of instructions 254 such as firmware may be embedded with microcontroller chip 250, for example a controller integrated circuit. In other embodiments, the Bluetooth® cloning and switching system 240 may operate in part as software or firmware instructions executed on the wireless speaker and microphone device 230 or the information handling system 200. The instructions 254 may embody one or more of the methods or logic as described herein. For example, instructions relating to the Bluetooth® cloning and switching system 240, firmware or software algorithms, processes, and/or methods may be stored here.

Memory 209 may contain computer-readable medium (not shown), such as RAM in an example embodiment. An example of memory 209 includes random access memory (RAM) such as static RAM (SRAM), dynamic RAM (DRAM), non-volatile RAM (NV-RAM), or the like, read only memory (ROM), another type of memory, or a combination thereof. Memory 209 may also comprise static memory containing computer-readable medium (not shown), such as NOR or NAND flash memory in some example embodiments. The instructions, parameters, and profiles 254 of the Bluetooth® cloning and switching system 240 may be stored in memory 209 on a computer-readable medium 252 such as a flash memory or magnetic disk in an example embodiment. More specifically, computer readable medium 252 in an embodiment may store pairing or wireless communication profiles for identifying the first wireless speaker and microphone device 230 to the information handling system 200 as a device authorized to transceive data with the first wireless speaker and microphone device 230, as well as information sufficient to identify the first wireless speaker and microphone device 230, such as a Media Access Control (MAC) address, IP address. The pairing or wireless communication profiles in an embodiment may further store various types of information necessary to perform a handshake between the wireless speaker and microphone device 230 and the information handling system 200, such as various public keys, private keys, hashing algorithms, short-term keys, long-term keys, or encryption/decryption algorithms. In an embodiment in which the wireless speaker and microphone device 230 has paired with a second wireless speaker and microphone device 280, as described in greater detail herein, the memory 209 may store a cloned pairing or wireless communication profile received for transmission to the second wireless speaker and microphone device 280, to allow the second wireless speaker and microphone device 280 to establish a cloned wireless link with the information handling system 200 during an active audio data stream transmission from the information handling system 200 and the first wireless speaker and microphone device 230.

Figure 3:
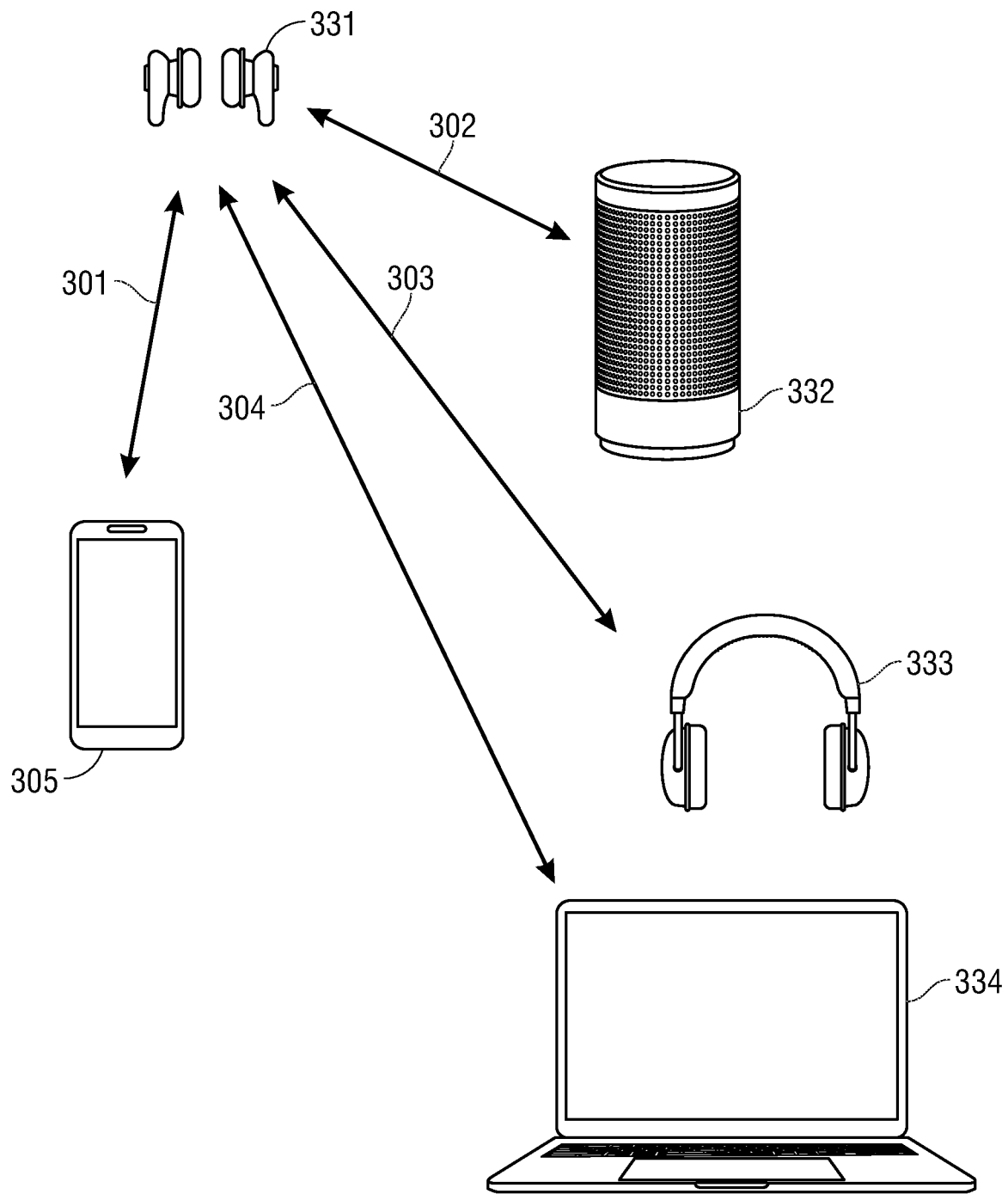
FIG. 3 is a graphical diagram illustrating a wireless speaker and microphone device paired with an information handling system according to an embodiment of the present disclosure.

FIG. 3 is a graphical diagram illustrating a first wireless speaker and microphone device paired with an information handling system and a plurality of other wireless speaker and microphone devices according to an embodiment of the present disclosure. A first wireless speaker and microphone device 331 (e.g., earbuds) in an embodiment may pair in a first pairing for a first wireless link 301 with a mobile information handling system 305 (e.g., smart phone) in an embodiment prior to transmission of any audio signals pursuant to a phone call, online meeting, or other active audio data stream via the mobile information handling system 305. For example, the first wireless speaker and microphone device 331 in an embodiment may exchange pairing or wireless communication profiles with the mobile information handling system 305 for the first pairing for a first wireless link 301. The mobile information handling system 305 and the first wireless speaker and microphone device 331 in such an embodiment may further perform various types of handshakes using various public keys, private keys, hashing algorithms, short-term keys, or long-term keys as a portion of such a pairing procedure. Any information required to perform such a handshake (e.g., public keys, private keys, hashing algorithms, short-term keys, or long-term keys) as well as information specifically identifying the first wireless speaker and microphone device 331 or the mobile information handling system 305 in an embodiment (e.g., MAC addresses for either device) may be stored at both the mobile information handling system 305 and the first wireless speaker and microphone device 331 as a pairing and wireless communication profile related to the first pairing for the first wireless link 301.

Following pairing with the mobile information handling system 305 in an embodiment, the first wireless speaker and microphone device 331 may further pair via second pairing with one or more additional wireless speaker and microphone devices at wireless links 302, 303, or 304, such as, for example, a smart speaker 332, headphones 333, or a laptop information handling system 334 to conduct a pre-setting procedure. Such a second pairing process for pre-setting may involve establishing second wireless link 302 such that the first wireless speaker and microphone device 331 clones the pairing or wireless communication profile stored at the first wireless speaker and microphone device as a result of the first pairing process for wireless link 301 between the first wireless speaker and microphone device 331 and the mobile information handling system 305 for transmission to a second wireless speaker and microphone device 332. In the second pairing process, the first wireless speaker and microphone device 331 may perform any handshakes or authentication procedures routinely required for pairing processes between the first wireless speaker and microphone device 331 and any of the additional wireless speaker and microphone devices (e.g., 332, 333, and 334) in various embodiments for a wireless links 302, 303, and 304 to those wireless speaker devices from the first wireless speaker device 331.

Upon such a pre-setting authentication and pairing for one or more wireless links 302, 303 or 304, the first wireless speaker and microphone device 331 may transmit to any or each of the paired additional wireless speaker and microphone devices (e.g., 332, 333, and 334) the cloned pairing and wireless communication profile generated as a result of the initial first pairing of the first wireless link 301 between the first wireless speaker and microphone device 331 and the mobile information handling system 305. Any one of the additional wireless speaker and microphone devices (e.g., 332, 333, and 334) in an embodiment may store this pairing and wireless communication profile for the first pairing locally for later use in setting up a cloned wireless Bluetooth® or BLE link pairing and parallel wireless link or links (not shown) with information handling system 305 in parallel to the paired Bluetooth® or BLE wireless link 301 between 331 and 305. In an embodiment, these parallel cloned Bluetooth® or BLE wireless links may be used by 332, 333, or 334 to seamlessly switch into and receive or transmit with an active audio data stream from the information handling system 305, as described in greater detail with respect to FIG. 5, below and according to embodiments herein. The cloned pairing and wireless communication profile may be stored at 332, 333, or 334 for later use in seamless Bluetooth switching via parallel, cloned wireless links with the information handling system 305.

Figure 4:
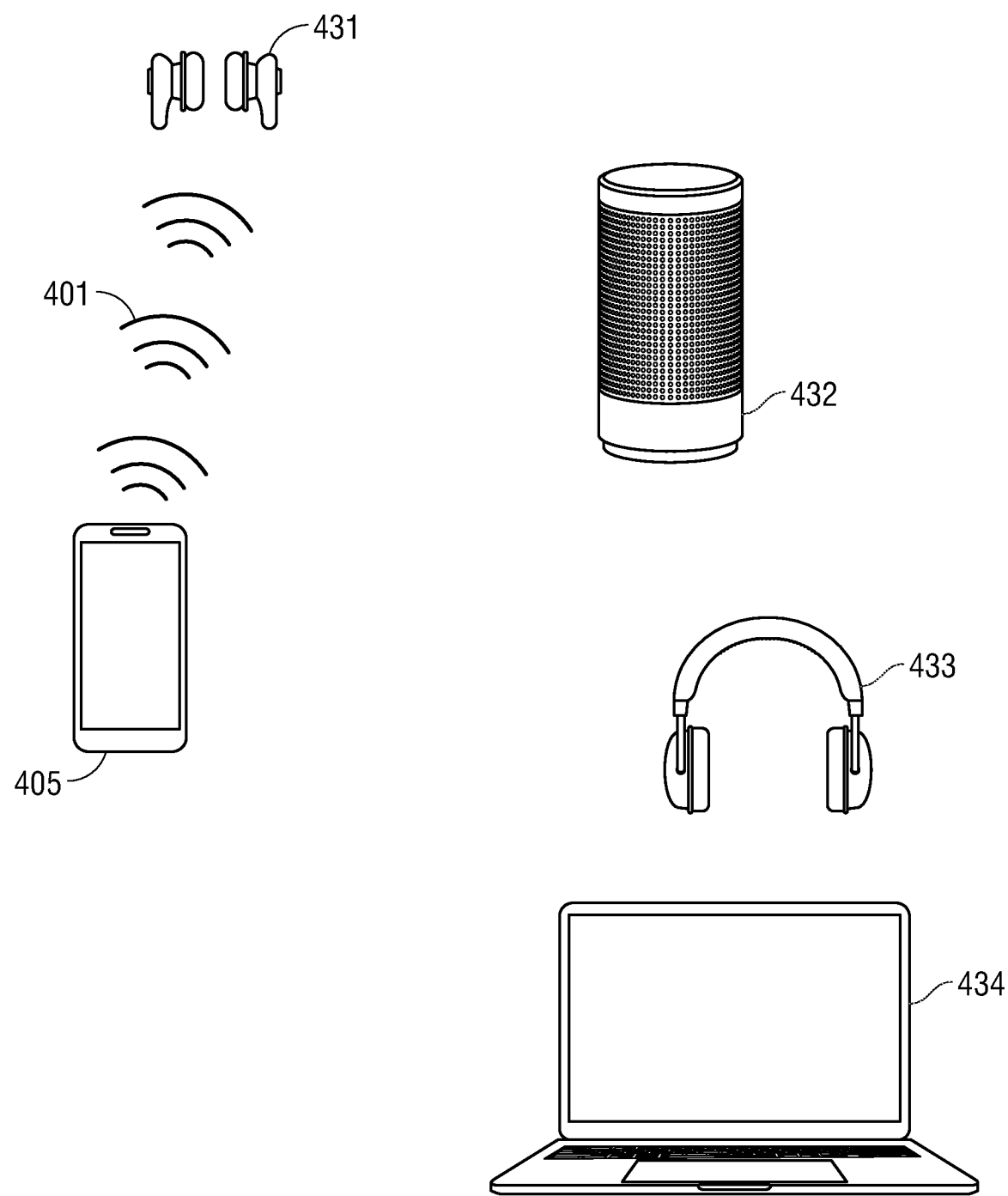
FIG. 4 is a graphical diagram illustrating a wireless speaker and microphone device transceiving an audio data stream according to an embodiment of the present disclosure.

FIG. 4 is a graphical diagram illustrating a first wireless speaker and microphone device transceiving audio data pursuant to an established call, online meeting, or other active audio data stream according to an embodiment of the present disclosure. The mobile information handling system 405 may initiate an active audio data stream with a remote participant via a network, or locally in an embodiment. For example, the active audio data stream may comprise a phone call established via a cellular network, may comprise an online meeting (e.g., Zoom® meeting or Microsoft® Teams® meeting) established via the world-wide web, or may comprise music streamed from a local or network source. The mobile information handling system 405 may already be paired with the first wireless speaker and microphone device 431 (e.g., as described above with respect to FIG. 3) via a direct Bluetooth® or BLE wireless link 401. Upon establishment of the active audio data stream at the mobile information handling system 405 in an embodiment, the first wireless speaker and microphone device 431 may enable output of the active audio data stream via a speaker, and input to the active audio data stream via a microphone at the first wireless speaker and microphone device 431.

Figure 5:
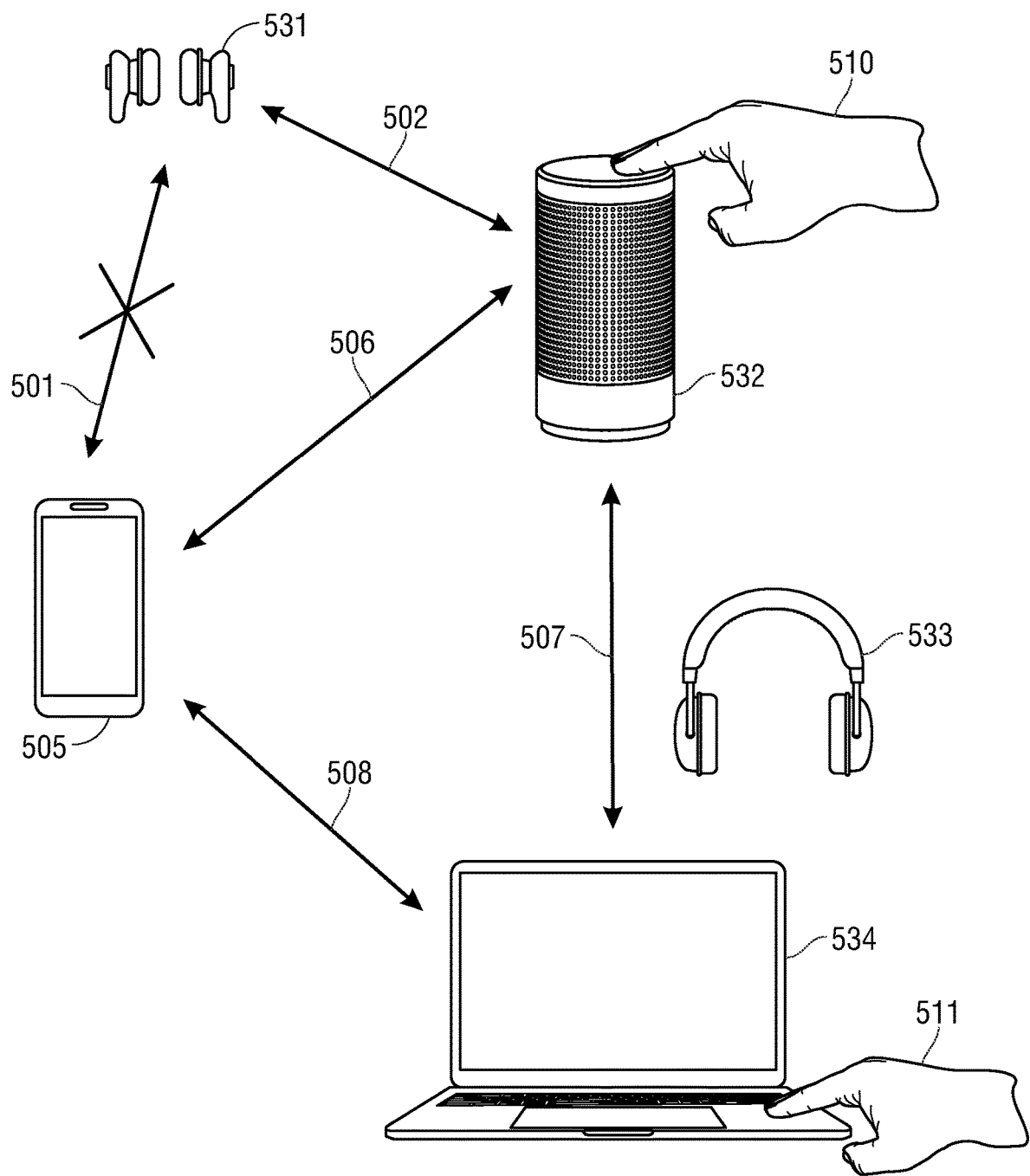
FIG. 5 is a graphical diagram illustrating an active audio data stream handed off from a first to a second wireless speaker and microphone device according to an embodiment of the present disclosure.

FIG. 5 is a graphical diagram illustrating an active audio data stream handed off from a first to a second wireless speaker and microphone device, without intervention by the mobile information handling system that initiated the active audio data stream according to an embodiment of the present disclosure. As described above with respect to FIG. 3, the first wireless speaker and microphone device 531 (e.g., earbuds) may share cloned pairing and wireless communication profiles with each of the other wireless speaker and microphone devices (e.g., 532, 533, or 534) during a pre-setting process. This may then enable the seamless switching of an active audio data stream such as shown in FIG. 4 from a first wireless speaker and microphone device 531 to any other wireless speaker and microphone device such as 532 or 534 according to the illustrated embodiment.

One or more of these other wireless speaker and microphone devices (e.g., 532, 533, or 534) in an embodiment may automatically establish Bluetooth® or BLE wireless links with the mobile information handling system 505 in an embodiment when the mobile information handling system 505 comes within range of these devices. For example, when the mobile information handling system 505 comes within communication range of the second wireless speaker and microphone device 532 (e.g., smart speaker), the second wireless speaker and microphone device 532 may advertise both the cloned pairing and wireless communication profile authorizing communication with the first wireless speaker and microphone device 531 and a separate pairing and wireless communication profile identifying the second wireless speaker and microphone device 532. When the mobile information handling system 505 is already communicating with the first wireless speaker and microphone device 531 via a wireless link established with the pairing and wireless communication profile authorizing communication with the first wireless speaker and microphone device 531, the information handling system 505 will select the cloned pairing and wireless communication profile and establish a cloned Bluetooth® or BLE wireless link 506 with the mobile information handling system 505 using the cloned pairing and wireless communication profiles specifically authorizing communication with the first wireless speaker and microphone device 531. More specifically, if the information handling system 505 is already paired and occupied with audio data streaming to the first wireless speaker and microphone device 531 via paired wireless link 501, the other wireless speaker and microphone devices 532, 533, and 534 will not be designated as a primary wireless speaker and microphone device for the information handling system and will not auto-pair with their own device profiles but instead prepare to use the cloned pairing and wireless communication profiles for the first pairing of wireless link 501.

As another example, when the mobile information handling system 505 comes within communication range of the third wireless speaker and microphone device 534 (e.g., laptop), the third wireless speaker and microphone device 534 may establish a cloned Bluetooth® or BLE wireless link 508 with the mobile information handling system 505 using the cloned pairing and wireless communication profiles specifically authorizing communication with the first wireless speaker and microphone device 531. The second and third wireless speaker and microphone devices (e.g., 532 and 534) in such an embodiment may establish wireless links 506 and 508, but may not activate the radio to demodulate/modulate and process the audio data to receive the active audio data stream transmitting that is currently transmitted and received with the first wireless speaker and microphone device 532 via wireless link 501 on those wireless links 506 and 508. In another embodiment, the second and third wireless speaker and microphone devices (e.g., 532 and 534) in such an embodiment may establish wireless links 506 and 508, but may not employ their respective speakers and microphones to provide input or output for the received active audio data stream. In other words, the second wireless speaker and microphone device 532 may receive the audio data stream from the mobile information handling system 505, but may not demodulate or modulate and process it or may not output the audio data stream via the speaker or provide input to the active audio data stream via the microphone of the second wireless speaker and microphone device 532. The first wireless speaker and microphone device 531 may control the active audio data stream until it receives a switching command from another wireless speaker and microphone device (e.g., 532) in an embodiment.

The user at 510 may initiate a switch instruction by providing some user input (e.g., pressing a button, providing voice input, moving a switch, touching a capacitive or resistive switch) at a second wireless speaker and microphone device 532 (e.g., smart speaker) indicating a desire to make the second wireless speaker and microphone device 532 the primary source of input (e.g., via a microphone) and output (e.g., via a speaker) for the active audio data stream (e.g., call, meeting, or session) previously established via the mobile information handling system 505 (e.g., as described above with respect to FIG. 4). The Bluetooth® cloning and switching system operating at the second wireless speaker and microphone device 532 (e.g., smart speaker) in an embodiment may consequently transmit a switch command to the Bluetooth® cloning and switching system operating at the first wireless speaker and microphone device 531 (e.g., earbuds), via wireless link 502, to initiate switching audio transmission and reception to the second wireless speaker and microphone device 532. In an embodiment, this switch command may cause the Bluetooth® cloning and switching system to cease audio transmission and reception at the first wireless speaker and microphone device 531 either by ceasing modulation and demodulation or processing of the active audio data stream or not processing it through the speaker or from the microphone at the wireless speaker and microphone device 531.

The Bluetooth® cloning and switching system operating at the first wireless speaker and microphone device 531 (e.g., earbuds) in embodiments may consequently cease transmitting audio input from the microphone or playing audio at the speaker of the first wireless speaker and microphone device 531 via wireless link 501 as part of the active audio data stream. The first wireless speaker and microphone device 531 (e.g., earbuds) may also provide an acknowledgement of the switch command via the wireless link 502 to the second wireless speaker and microphone device 532. The Bluetooth® cloning and switching system operating at the second wireless speaker and microphone device 532 (e.g., smart speaker) in an embodiment may thus begin modulating/demodulating and processing the active audio data stream with the information handling system 505 via the cloned, parallel wireless link 506. This will result in the wireless speaker and microphone device 532 transmitting audio input at the microphone of the second wireless speaker and microphone device 532 via wireless link 506. The second wireless speaker and microphone device 532 may also begin outputting speaker audio from the audio data stream received via wireless link 506 to the speaker of the second wireless speaker and microphone device 532.

As described above with respect to FIG. 3, the pairing and wireless communication profile provided to the mobile information handling system 505 by the first wireless speaker and microphone device 531 during establishment of Bluetooth® or BLE wireless link 501 may match the cloned pairing and wireless communication profile provided to the mobile information handling system 505 by the second wireless speaker and microphone device 532 during establishment of Bluetooth® or BLE wireless link 506. As a consequence, the first and second wireless speaker and microphone devices (e.g., 531 and 532) may be indistinguishable between Bluetooth® or BLE wireless links 501 and 506 to the mobile information handling system 505 (e.g., smart phone) for the active audio data stream (e.g., call, meeting, or session). Thus, the second wireless speaker and microphone device 532 (e.g., smart speaker) may join the active audio data stream (e.g., call, meeting, or session) without requiring the user to instruct the mobile information handling system 505 to handoff the active audio data stream between two separate wireless speaker and microphone devices (e.g., 531 and 532) via a GUI at the mobile information handling system 505. Further, the first wireless speaker and microphone device 531 and the second wireless speaker and microphone device 532 conduct the switching so that both do not transmit and receive on the active audio data stream at the same time. This makes switching seamless and simpler and avoids interruptions or dropped wireless links. The second remote wireless speaker and microphone device 532 may then commence audio transmission or reception via the cloned Bluetooth® or BLE wireless link 506 for the seamless audio data streaming upon the switching between wireless speaker and microphone devices.

In some embodiments, while the second wireless speaker and microphone device 532 is operating as the primary point of input (e.g., via a microphone) and output (e.g., via a speaker) for the active audio data stream initiated by the mobile information handling system 505, the user at 511 may initiate a switch instruction at a third wireless speaker and microphone device 534 (e.g., laptop) indicating a desire to make the third wireless speaker and microphone device 534 the primary source of input (e.g., via a microphone) and output (e.g., via a speaker) for the active audio data stream (e.g., call, meeting, or session) previously established via the mobile information handling system 505. The Bluetooth® cloning and switching system operating at the third wireless speaker and microphone device 534 (e.g., laptop) in an embodiment may consequently transmit a switch command to the Bluetooth® cloning and switching system operating at the second wireless speaker and microphone device 532 (e.g., smart speaker), via a wireless link 507 to initiate switching audio transmission and reception to the third wireless speaker and microphone device 534 and to cease audio transmission and reception at the second wireless speaker and microphone device 532.

The Bluetooth® cloning and switching system operating at the second wireless speaker and microphone device 532 (e.g., smart speaker) in embodiments may consequently cease modulating, demodulating and processing the active audio data stream via the cloned second wireless link 506 with information handling system 505. Further, Bluetooth® cloning and switching system operating at the second wireless speaker and microphone device 532 (e.g., smart speaker) in embodiments transmits and acknowledgement via wireless link 507 to the third wireless speaker and microphone device 534 that the switch command has been received. Thus, the second wireless speaker and microphone device 532 ceases transmitting audio input at the microphone of the second wireless speaker and microphone device 532 via cloned, second wireless link 506 as part of the active audio data stream. The second wireless speaker and microphone device 532 (e.g., smart speaker) may also cease outputting speaker audio from the audio data stream received via wireless link 506 to the speaker of the second wireless speaker and microphone device 532.

The Bluetooth® cloning and switching system operating at the third wireless speaker and microphone device 534 (e.g., laptop) in an embodiment, and upon receiving an acknowledgement from the second wireless speaker and microphone device 532, may begin modulating, demodulating and processing the active audio data stream via the cloned, third wireless link 508. Thus, the third wireless speaker and microphone device 534 may begin transmitting audio input at the microphone of the third wireless speaker and microphone device 534 via cloned, third wireless link 508. The third wireless speaker and microphone device 534 may also begin outputting speaker audio from the audio data stream received via cloned, third wireless link 508 to the speaker of the third wireless speaker and microphone device 534.

As described above with respect to FIG. 3, the pairing and wireless communication profile provided to the mobile information handling system 505 by the first wireless speaker and microphone device 531 during establishment of Bluetooth® or BLE first wireless link 501 for the first pairing may match the cloned pairing and wireless communication profile provided to the mobile information handling system 505 provided by the second wireless speaker and microphone device 532 during establishment of Bluetooth® or BLE cloned, second wireless link 506, and the cloned pairing and wireless communication profile provided to the mobile information handling system 505 by the third wireless speaker and microphone device 534 during establishment of Bluetooth® or BLE cloned, third wireless link 508. As a consequence, the first, second, and third wireless speaker and microphone devices (e.g., 531, 532, and 534) may be indistinguishable between Bluetooth® or BLE wireless links 501, 506, and 508 to the mobile information handling system 505 (e.g., smart phone) for the active audio data stream (e.g., call, meeting, or session). Thus, the third wireless speaker and microphone device 534 (e.g., laptop) may join the active audio data stream (e.g., call, meeting, or session) without requiring the user to instruct the mobile information handling system 505 to handoff the active audio data stream between two separate wireless speaker and microphone devices (e.g., 532 and 534) via a GUI at the mobile information handling system 505. The third remote wireless speaker and microphone device 534 may then commence audio transmission or reception via the cloned, third Bluetooth® or BLE wireless link 508 for seamless audio data streaming of the active audio data stream with the information handling system 505. In such a way, the Bluetooth® cloning and switching system operating at a plurality of wireless speaker and microphone devices in embodiments of the present disclosure may allow a user to switch between these wireless speaker and microphone devices as the primary source of input/output during an active audio data stream, without interacting with a GUI of the mobile information handling system.

Figure 6:
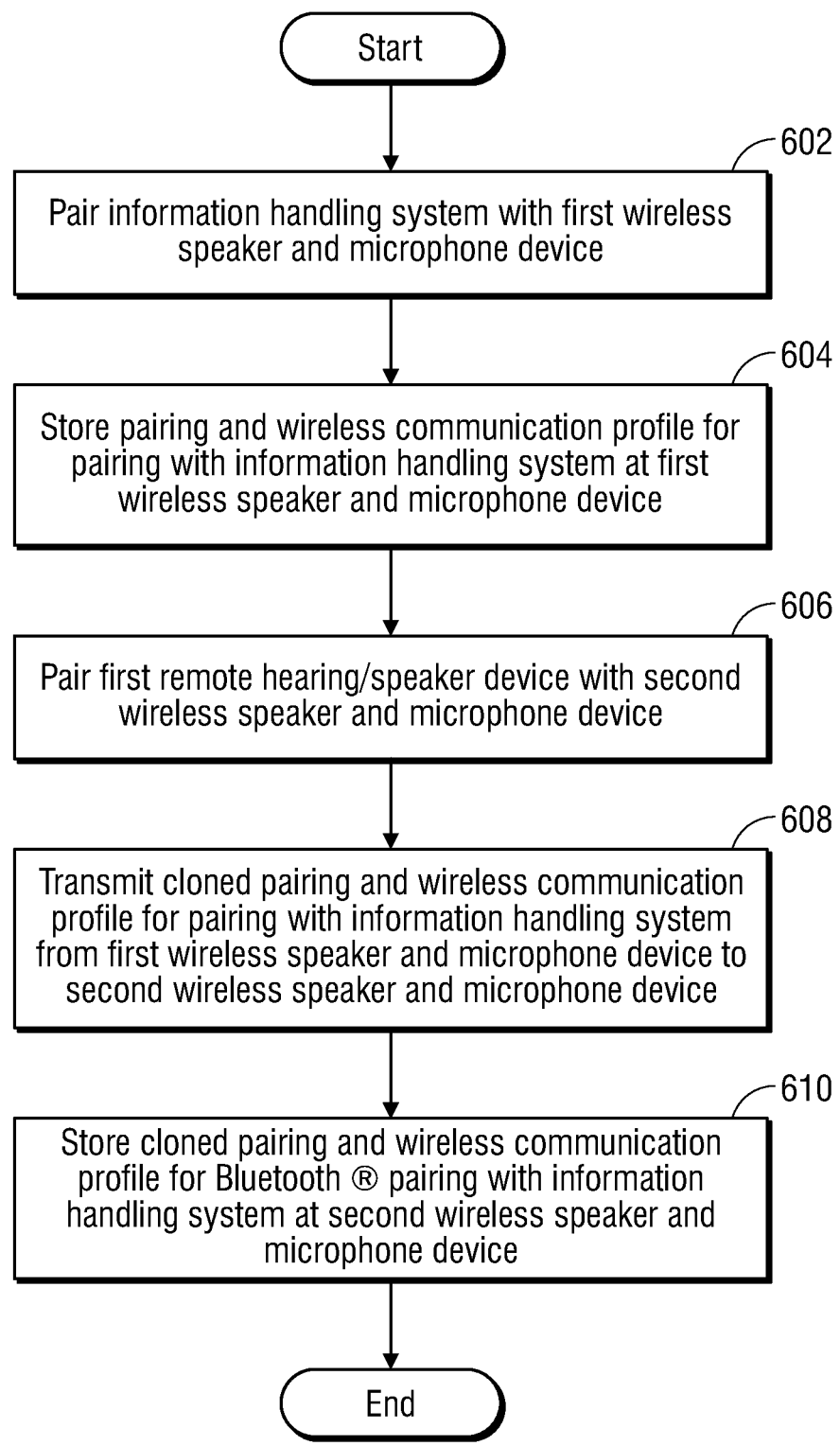
FIG. 6 is a flow diagram illustrating a method of cloning and sharing a pairing and wireless communication profile according to an embodiment of the present disclosure.

FIG. 6 is a flow diagram illustrating a method of cloning and sharing a pairing and wireless communication profile for a first pairing between an information handling system and a first wireless speaker and microphone device during a pre-setting procedure according to an embodiment of the present disclosure. As described herein, one of a plurality of wireless speaker and microphone devices (e.g., earbuds) in an embodiment may established a paired Bluetooth® or BLE wireless link for later use during an active audio data stream with a mobile information handling system (e.g., smart phone) by establishing a pairing and wireless communication profile unique to the first wireless speaker and microphone device (e.g., earbuds) with the mobile information handling system (e.g., smart phone). The Bluetooth® cloning and switching system operating at the first wireless speaker and microphone device may store in memory and share with a second wireless speaker and microphone device a copy or clone of the pairing and wireless communication profile for the first pairing established with the mobile information handling system. One or more steps of this process may be performed prior to transceiving of an active audio data stream with the mobile information handling system, in order to setup communications between the first and second wireless speaker and microphone devices such that a later-initiated active audio data stream may be automatically and seamlessly handed off from the first wireless speaker and microphone device to the second wireless speaker and microphone device.

At block 602, the information handling system may be paired with the first wireless speaker and microphone device in a first pairing in an embodiment. For example, in an embodiment described with reference to FIG. 3, above, the first wireless speaker and microphone device 331 in an embodiment may establish pairing or wireless communication profiles with the mobile information handling system 305 to conduct a first pairing between them. The mobile information handling system 305 and the first wireless speaker and microphone device 331 in such an embodiment may further perform various types of handshakes using various public keys, private keys, hashing algorithms, short-term keys, or long-term keys as a portion of such a pairing procedure. The mobile information handling system 305 may then establish a Bluetooth® or BLE wireless link 301 with the first wireless speaker and microphone device 331 in an embodiment.

As described in an embodiment with respect to FIG. 1, the wireless network interface device 160 of the mobile information handling system 100 in an embodiment may transmit and receive information necessary to pair the wireless speaker and microphone device 130 with the information handling system 100 under a Bluetooth® or BLE protocol pursuant to execution by the processor 101 of code instructions 154 of the wireless communication device pairing system 140. Such information may include, for example, pairing or wireless communication profiles for the information handling system 100 and the wireless speaker and microphone device 130. Such pairing or wireless communication profiles may operate to identify the wireless speaker and microphone device 130 as a device authorized to transceive data with the information handling system 100, as well as information sufficient to identify the wireless speaker and microphone device 130, such as a Media Access Control (MAC) address, IP address. The pairing or wireless communication profiles in an embodiment may further store various types of information necessary to perform the handshake between the wireless speaker and microphone device 130 and the information handling system 100 described above, such as various public keys, private keys, hashing algorithms, short-term keys, long-term keys, or encryption/decryption algorithms.

As described in an embodiment with respect to FIG. 2, speaker and microphone wireless radio system 299 of the wireless speaker and microphone device 230 in an embodiment may transmit and receive information necessary to pair the wireless speaker and microphone device 230 with the information handling system 200 in a first pairing under a Bluetooth® or BLE protocol pursuant to execution by the microcontroller chip 250 of code instructions 254 of the Bluetooth® cloning and switching system 240.

The pairing and wireless communication profiles required for the first pairing with the information handling system may be stored in an embodiment at the first wireless speaker and microphone device at block 604. For example, as described with reference to FIG. 2, the pairing or wireless communication profiles received from the information handling system 200 reflecting the first pairing with the first wireless speaker and microphone device 230 may be stored at the wireless speaker and microphone device 230 (e.g., as described at block 602) at the memory 209 of the wireless speaker and microphone device 230. Also, as described above with reference to FIG. 1, the pairing or wireless communication profiles (e.g., profiles established during the first pairing with the wireless speaker and microphone device 130 at block 602 above) in an embodiment may be stored at the mobile information handling system in computer readable medium 152.

At block 606, the first wireless speaker and microphone device may be paired with a second wireless speaker and microphone device in an embodiment. For example, in an embodiment described with reference to FIG. 3, above, the first wireless speaker and microphone device 331 may further pair with one or more additional wireless speaker and microphone devices, such as, for example, a smart speaker 332, headphones 333, or a laptop information handling system 334 via wireless links 302, 303, or 304. More specifically, the first wireless speaker and microphone device 331 may establish a second Bluetooth® or BLE wireless link 302 with the second wireless speaker and microphone device 302, a third Bluetooth® or BLE wireless link 303 with the third wireless speaker and microphone device 333, or a fourth Bluetooth® or BLE wireless link 304 with the fourth wireless speaker and microphone device 334 in an embodiment. It is contemplated that any two wireless speaker and microphone devices may pair and establish a wireless link in some embodiments. Such a pairing process may establish a wireless link for the first wireless speaker and microphone device 331 to clone the pairing or wireless communication profile stored at the first wireless speaker and microphone device as a result of the first pairing process between the first wireless speaker and microphone device 331 and the mobile information handling system 305 to be transmitted to other wireless speaker and microphone devices in a pre-setting procedure. The first wireless speaker and microphone device 331 may perform any handshakes or authentication procedures routinely required for pairing processes between the first wireless speaker and microphone device 331 and any of the additional wireless speaker and microphone devices (e.g., 332, 333, and 334) to establish paired wireless links 302, 303, or 304.

In an embodiment, a cloned pairing and wireless communication profile for pairing the information handling system and the first wireless speaker and microphone device may be transmitted to the second wireless speaker and microphone device at block 608. For example, the first wireless speaker and microphone device 331 may transmit to each of the paired additional wireless speaker and microphone devices (e.g., 332, 333, and 334), via the Bluetooth® or BLE wireless links 302, 303, and 304, respectively, the cloned pairing and wireless communication profile generated as a result of the initial first pairing between the first wireless speaker and microphone device 331 and the mobile information handling system 305.

At block 610, the cloned pairing and wireless communication profile for pairing with the information handling system, as received from the first wireless speaker and microphone device, may be stored at the second wireless speaker and microphone device in an embodiment. In example embodiments, any one of the additional wireless speaker and microphone devices (e.g., 332, 333, and 334) may store the received, cloned pairing and wireless communication profile locally for later use in establishing cloned Bluetooth® or BLE wireless links directly with the mobile information handling system 305 in parallel to wireless link 301 for seamless switching from the Bluetooth® or BLE wireless link 301 of the first wireless speaker and microphone device 331 during an ongoing call, online meeting, or other type of active audio data stream, as described in greater detail with respect to FIG. 5, above, and FIGS. 7A and 7B, below and according to embodiments herein. In such a way, parallel, duplicate Bluetooth® or BLE wireless links may be setup for both the first and second or other wireless speaker and microphone devices with the mobile information handling system, such that a later-initiated active audio data stream on that information handling system may be automatically and seamlessly handed off from one wireless speaker and microphone device to another. Then a user switching input command may determine the second wireless speaker and microphone device, or one of the other wireless speaker and microphone devices, will transmit and receive audio data and the first wireless speaker and microphone device will cease transmitting and receiving audio data. The method for cloning and sharing a pairing and wireless communication profile for pairing between an information handling system and a first wireless speaker and microphone device may then end.

Figure 7A:
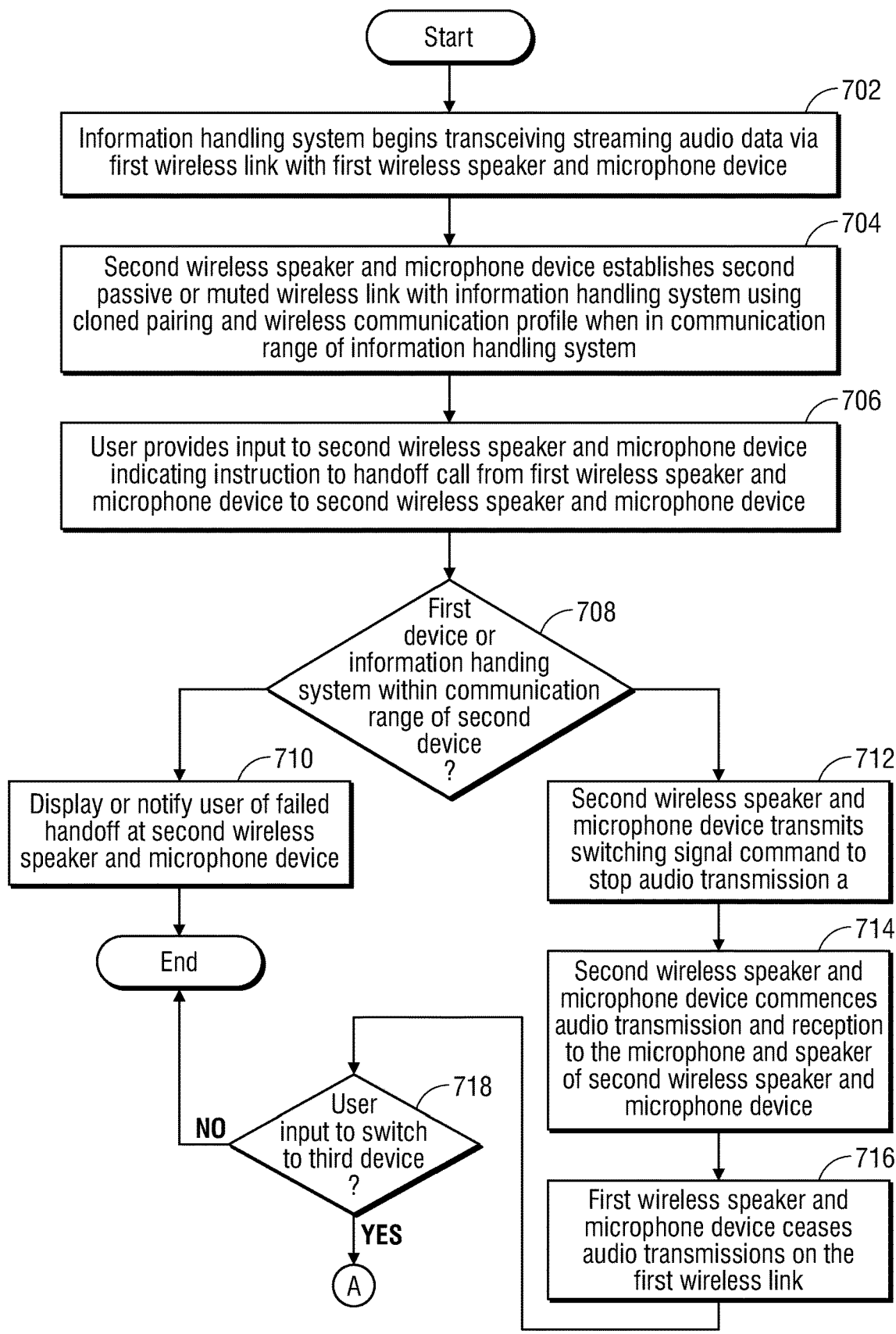
FIG. 7A is a flow diagram illustrating a method of handing off an active audio stream from a first to a second wireless speaker and microphone device according to an embodiment of the present disclosure.

FIG. 7A is a flow diagram illustrating a method of automatically and seamlessly handing off an active audio data stream with an information handling system from a first wireless speaker and microphone device to a second wireless speaker and microphone device according to an embodiment of the present disclosure. As described herein, upon setting up communications between the first and second wireless speaker and microphone devices in an embodiment and sharing a cloned pairing and wireless communication profiles via a pre-setting procedure, such as described above with respect to FIG. 6, an active audio data stream between an information handling system and a first wireless speaker and microphone device may be automatically and seamlessly handed off to a second wireless speaker and microphone device with minimal input by the user, and little or no input provided directly to the information handling system.

At block 702, an active audio data stream may be transceived on a Bluetooth® or BLE wireless link between the first wireless speaker and microphone device and an information handling system in an embodiment. For example, in an embodiment described with reference to FIG. 3, the first information handling system 331 may establish a Bluetooth® or BLE wireless link 301 with the mobile information handling system 305. As another example, in an embodiment described with reference to FIG. 4, the mobile information handling system 405 may initiate an active audio data stream such as a phone call established via a cellular network, an online meeting (e.g., Zoom® meeting or Microsoft® Teams® meeting) established via the worldwide web, or music streamed from a local or network source. The mobile information handling system 405 may already be paired with the first wireless speaker and microphone device 431 (e.g., as described above with respect to FIG. 3) via a direct Bluetooth® or BLE wireless link 401. Upon establishment of the active audio data stream at the mobile information handling system 405 in an embodiment, the first wireless speaker and microphone device 431 may enable output of the active audio data stream via a speaker, and input to the active audio data stream via a microphone at the first wireless speaker and microphone device 431.

The second wireless speaker and microphone device in an embodiment may establish a second passive or muted wireless link with the information handling system using a cloned pairing and wireless communication profile at block 704 when within communication range of the mobile information handling system. For example, in an embodiment described with reference to FIG. 5, one or more additional wireless speaker and microphone devices (e.g., 532, 533, or 534) in an embodiment may automatically establish Bluetooth® or BLE cloned wireless links, such as 506 or 508, with the mobile information handling system 505 in parallel to wireless link 501 in an embodiment when the mobile information handling system 505 comes within range of these devices. More specifically, when the mobile information handling system 505 comes within communication range of the second wireless speaker and microphone device 532 (e.g., smart speaker), the second wireless speaker and microphone device 532 may establish a cloned Bluetooth® or BLE wireless link 506 with the mobile information handling system 505 using the cloned pairing and wireless communication profiles specifically authorizing communication with the first wireless speaker and microphone device 531. The second wireless speaker and microphone device 532 may determine that the information handling system 505 is actively paired and transceiving an audio data stream with a first wireless speaker and microphone device 531 and, thus, may not auto-pair itself using its own credentials, but instead may establish a "silent," cloned second wireless link 506 in parallel to the wireless link 501. The second wireless speaker and microphone device 532 may not modulate, demodulate or process audio data with the active audio data stream via the cloned second wireless link 506 with the information handling system until a user input to switch is received. In other words, the second wireless speaker and microphone device 532 may receive the audio data stream from the mobile information handling system 505, but may not process or output the audio data stream via the speaker or provide input to the active audio data stream via the microphone of the second wireless speaker and microphone device 532.

The user in an embodiment may provide user input to a second wireless speaker and microphone device indicating an instruction to handoff the active audio data stream from the first wireless speaker and microphone device to the second wireless speaker and microphone device at block 706. For example, in an embodiment described with reference to FIG. 5, the user 510 may initiate a switch instruction by providing some user input (e.g., pressing a button, providing voice input, moving a switch, initiating a capacitive touch switch or a resistive touch switch with a capacitive or resistive sensor on the housing of the wireless speaker and microphone device) at a second wireless speaker and microphone device 532 (e.g., smart speaker) indicating a desire to make the second wireless speaker and microphone device 532 the primary source of input (e.g., via a microphone) and output (e.g., via a speaker) for the active audio data stream (e.g., call, meeting, or session) previously established via the mobile information handling system 505. As described in an embodiment at FIG. 2, an input/output device 220, such as a push button, a voice assistant, digital display, physical switch, a capacitive touch switch, or resistive or other touch switch, for example, may allow the user to indicate a desire to hand an active audio data stream off to the second wireless speaker and microphone device 532.

At block 708, it may be determined whether the first wireless speaker and microphone device is within communication range of the second wireless speaker and microphone device in an embodiment. In another aspect, at block 708, it may be determined whether the information handling system is within communication range of the second wireless speaker and microphone device in an embodiment. For example, in an embodiment described with reference to FIG. 2, the microcontroller chip 250 may execute code instructions 254 of the Bluetooth® cloning and switching system 240 to handoff an active audio data stream from the first wireless speaker and microphone device 230 to the second wireless speaker and microphone device 280 only upon determining that the second wireless speaker and microphone device 280 is within communication range of the first wireless speaker and microphone device 230. This may be determined passively, because the microcontroller 250 may only execute the instructions 254 in such a way following receipt of a switching command from the second wireless speaker and microphone device 280. If the second wireless speaker and microphone device 280 is not within communication range of the first wireless speaker and microphone device 230 at the time of transmission, the first wireless speaker and microphone device 230 may not receive the command. If the first wireless speaker and microphone device is not within communication range, successful handoff to the second wireless speaker and microphone device may not be possible, and the method may proceed to block 710 for notifying the user of this fact. Similarly, if the second wireless speaker and microphone device does not detect it is within communication range of the information handling system in an embodiment, a cloned, second wireless link with the information handing system may not be possible and the system will not transmit a switch command to the first wireless speaker and microphone device. The method may proceed to block 710 for notifying the user of this fact. If the first wireless speaker and microphone device or the information handling system is within communication range, the method may proceed to block 712 for execution of the requested handoff to the second wireless speaker and microphone device.

In an embodiment in which the second wireless speaker and microphone device is not within communication range of the first wireless speaker and microphone device or the information handling system, an output device at the second wireless speaker and microphone device may display a notification on a screen or via a light or other visual notification or provide an audio feedback such as an error tone of a failed pairing at block 710. For example, in an embodiment described with reference to FIG. 2, an input/output device 220, such as a push button, a voice assistant, digital display, or physical switch, for example, may provide visible (e.g., light flashing a certain color) or audible feedback (e.g., alarm, buzzer, or voice indicator) to a user that an attempt to pair the wireless speaker and microphone device 230 to the information handling system 200 has failed. The method for automatically and seamlessly handing off an active audio data stream with an information handling system from a first wireless speaker and microphone device to a second wireless speaker and microphone device may then end although the system may continue to monitor for another user switch input and the devices within communication range of one another.

At block 712, in an embodiment in which the second wireless speaker and microphone device is within communication range of the first wireless speaker and microphone device or the mobile information handling system providing an active audio data stream, the second wireless speaker and microphone device in an embodiment may transmit a switching signal command to stop audio transmission and reception at the first wireless speaker and microphone device via a wireless link between the first wireless speaker and microphone device and the second wireless speaker and microphone device. The first wireless speaker and microphone device may respond with an acknowledgement and then the second wireless speaker and microphone device may seamlessly switch audio transmission and reception to the second wireless speaker and microphone device from the first wireless speaker and microphone device by commencing transmission and reception on the active audio data stream with the mobile information handling system. For example, in an embodiment described with reference to FIG. 5, the Bluetooth® cloning and switching system operating at the second wireless speaker and microphone device 532 (e.g., smart speaker) in an embodiment may consequently transmit a switch command to the Bluetooth® cloning and switching system operating at the first wireless speaker and microphone device 531 (e.g., earbuds) via Bluetooth® or BLE wireless link 502 to initiate switching audio transmission and reception to the second wireless speaker and microphone device 532 by ceasing audio transmission and reception at the first wireless speaker and microphone device 531 via wireless link 501. The first wireless speaker and microphone device 531 may acknowledge via wireless link 502 of the received switch command.

At block 714, the second wireless speaker and microphone device may commence audio transmission and reception to the microphone and speaker of the second wireless speaker and microphone device. For example, in an embodiment described with reference to FIG. 5, the second wireless speaker and microphone device 532 may commence audio transmission and reception via the cloned wireless link 506 with the mobile information handling system 505 on the active audio data stream upon receipt of the acknowledgement from the first wireless speaker and microphone device 531 of the switch command. For example, the Bluetooth® cloning and switching system operating at the second wireless speaker and microphone device 532 (e.g., smart speaker) in an embodiment may begin transmitting audio input at the microphone of the second wireless speaker and microphone device 532 via wireless link 506. The second wireless speaker and microphone device 532 may also begin outputting audio data stream received via wireless link 506 to the speaker of the second wireless speaker and microphone device 532. The pairing and wireless communication profile provided to the mobile information handling system 505 by the first wireless speaker and microphone device 531 during establishment of Bluetooth® or BLE wireless link 501 for a first pairing may match the cloned pairing and wireless communication profile provided to the mobile information handling system 505 by the second wireless speaker and microphone device 532 during establishment of Bluetooth® or BLE cloned, second wireless link 506 pursuant to a cloned, second pairing. As a consequence, the first and second wireless speaker and microphone devices (e.g., 531 and 532) may be indistinguishable between Bluetooth® or BLE wireless links 501 and 506 to the mobile information handling system 505 (e.g., smart phone) for the active audio data stream (e.g., call, meeting, or session). Thus, the second wireless speaker and microphone device 532 (e.g., smart speaker) may join the active audio data stream (e.g., call, meeting, or session) without requiring the user to instruct the mobile information handling system 505 to handoff the active audio data stream between two separate wireless speaker and microphone devices (e.g., 531 and 532) via a GUI at the mobile information handling system 505. In such a way, the Bluetooth® cloning and switching system operating at a plurality of wireless speaker and microphone devices in embodiments of the present disclosure may allow a user to switch between these wireless speaker and microphone devices as the primary source of input/output during an active audio data stream, without interacting with a GUI of the mobile information handling system.

The first wireless speaker and microphone device in an embodiment may cease audio transmissions on the first wireless link at block 716. For example, the Bluetooth® cloning and switching system operating at the first wireless speaker and microphone device 531 (e.g., earbuds) in embodiments may consequently cease transmitting audio input at the microphone of the first wireless speaker and microphone device 531 via wireless link 501 as part of the active audio data stream upon receiving a switch command via wireless link 502 from the second wireless speaker and microphone device 532. The first wireless speaker and microphone device 531 (e.g., earbuds) may also cease outputting audio data stream received via wireless link 501 to the speaker of the first wireless speaker and microphone device 531. In this way, the first wireless speaker and microphone device 531 and second wireless speaker and microphone device 532 do not simultaneously transmit with the mobile information handling system.

At block 718, it may be determined whether a third wireless speaker and microphone device is within range and has received user input indicating a desire to handoff the current active audio data stream to the third wireless speaker and microphone device in an optional embodiment. For example, as described in an embodiment with respect to FIG. 5, while the second wireless speaker and microphone device 532 is operating as the primary point of input (e.g., via a microphone) and output (e.g., via a speaker) for the active audio data stream initiated by the mobile information handling system 505, the user at 511 may initiate a switch instruction at a third wireless speaker and microphone device 534 (e.g., laptop). Such a switch instruction may indicate a desire to make the third wireless speaker and microphone device 534 the primary source of input (e.g., via a microphone) and output (e.g., via a speaker) for the active audio data stream (e.g., call, meeting), or session previously established via the mobile information handling system 505. If the user has provided input indicating a desire to handoff the current active audio data stream to a third wireless speaker and microphone device, the method may proceed to block 720 of FIG. 7B. If the user has not provided input indicating a desire to handoff the current active audio data stream to a third wireless speaker and microphone device, the method for automatically and seamlessly handing off an active audio data stream with an information handling system from a first wireless speaker and microphone device to a second wireless speaker and microphone device may then end.

Figure 7B:
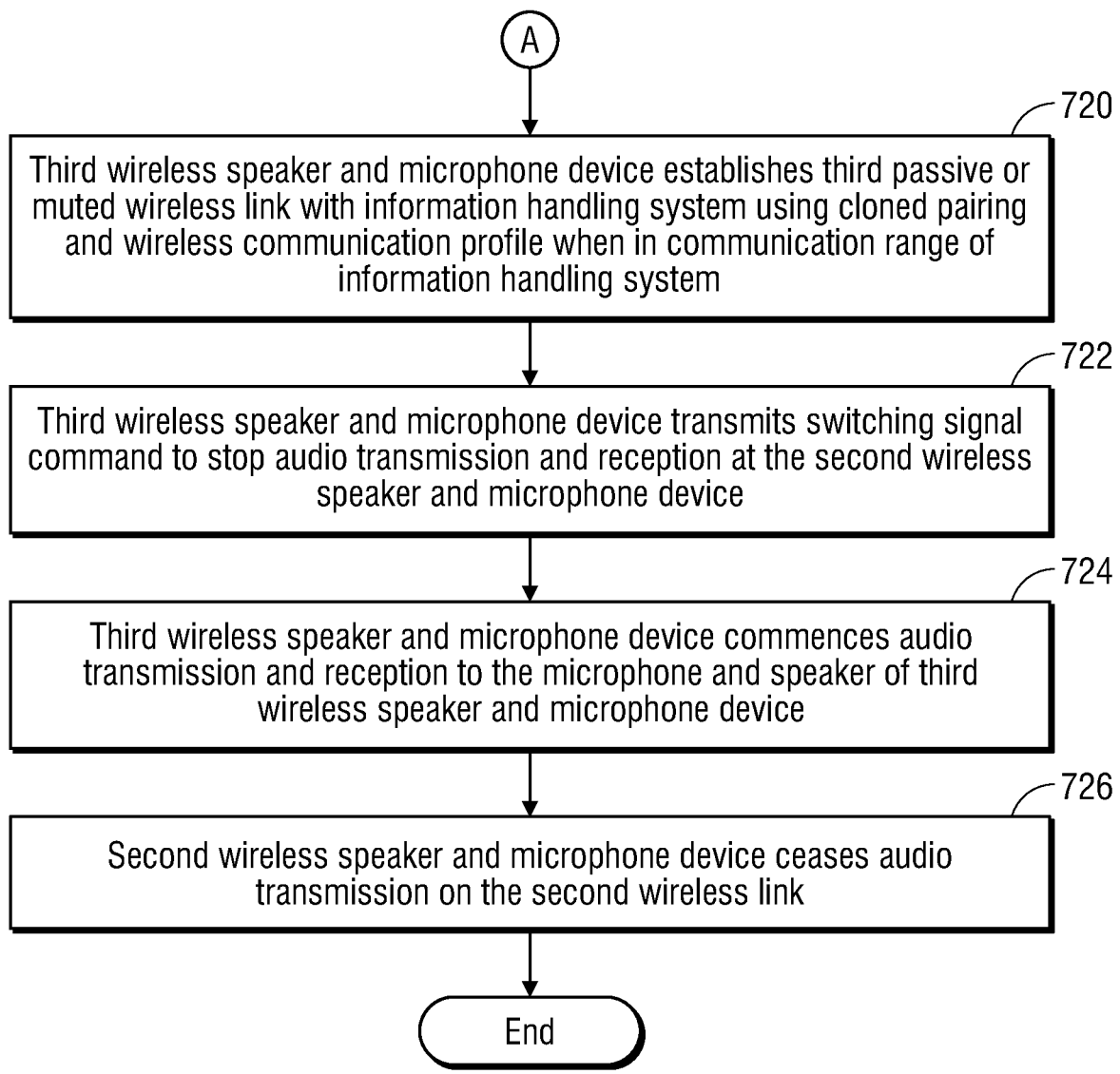
FIG. 7B is a flow diagram illustrating a method of handing off an active audio stream from a second to a third wireless speaker and microphone device according to an embodiment of the present disclosure.

FIG. 7B is a flow diagram illustrating a method of automatically and seamlessly handing off an active audio data stream with an information handling system from a second wireless speaker and microphone device to a third wireless speaker and microphone device according to an embodiment of the present disclosure. As described above, with respect to FIG. 7A, the user may provide input requesting a handoff of an active audio data stream shared between the information handling system and a second wireless speaker and microphone device via a cloned, second wireless link to a third wireless speaker and microphone device.

At block 720, a third wireless speaker and microphone device may establish a third passive or muted wireless link with the information handling system using the cloned pairing and wireless communication profiles for the first pairing when in communication range of the information handling system in an embodiment. For example, in an embodiment described with reference to FIG. 5, when the mobile information handling system 505 comes within communication range of the third wireless speaker and microphone device 534 (e.g., laptop), the third wireless speaker and microphone device 534 may establish a cloned, third Bluetooth® or BLE wireless link 508 with the mobile information handling system 505 using the cloned pairing and wireless communication profiles specifically authorizing communication with the first wireless speaker and microphone device 531 via the first pairing. The third wireless speaker and microphone device 534 in such an embodiment may then have a paired, wireless link 508 with the information handling system 505 receive the active audio data stream transmitting to the second wireless speaker and microphone device 532 via wireless link 508, but may not modulate, demodulate or process the active audio data stream currently transmitting and receiving with the second wireless speaker and microphone device 532 in embodiment. In an example embodiment, the third wireless speaker and microphone device 534 may not employ its local speaker and microphone to provide input or output for the received active audio data stream with the mobile information handling system 505 via cloned, third wireless link 508. In other words, the third wireless speaker and microphone device 534 may receive the audio data stream from the mobile information handling system 505, but may not modulate, demodulate, or process it or may not output the audio data stream via the speaker or provide input to the active audio data stream via the microphone of the third wireless speaker and microphone device 534.

The third wireless speaker and microphone device may receive a user switch input via a button, capacitive or resistive touch sensor, a slide switch, soft key or other method and transmit a switching signal command to stop audio transmission and reception at the second wireless speaker and microphone device in order to switch audio transmission and reception to the third wireless speaker and microphone device in an embodiment at block 722. For example, in an embodiment described with reference to FIG. 5, the Bluetooth® cloning and switching system operating at the third wireless speaker and microphone device 534 (e.g., laptop) in an embodiment may transmit a switch command to the Bluetooth® cloning and switching system operating at the second wireless speaker and microphone device 532 (e.g., smart speaker) via a wireless link 507 to initiate switching audio transmission and reception to the third wireless speaker and microphone device 534 and to cease audio transmission and reception at the second wireless speaker and microphone device 532. The second wireless speaker and microphone device 532 may respond with an acknowledgement to the third wireless speaker and microphone device 534 via wireless link 507.

At block 724, the third wireless speaker and microphone device may commence audio transmission and reception to the microphone and speaker of the second wireless speaker and microphone device. This may occur upon receipt of the acknowledgement of the switch command from the second wireless speaker and microphone device. For example, in an embodiment described with reference to FIG. 5, the Bluetooth® cloning and switching system operating at the third wireless speaker and microphone device 534 (e.g., laptop) in an embodiment may begin transmitting audio input at the microphone of the third wireless speaker and microphone device 534 via wireless link 508. The second wireless speaker and microphone device 534 may also begin outputting audio data stream received via wireless link 508 to the speaker of the third wireless speaker and microphone device 534. The pairing and wireless communication profile provided to the mobile information handling system 505 by the first wireless speaker and microphone device 531 during establishment of Bluetooth® or BLE wireless link 501 may match the cloned pairing and wireless communication profile provided to the mobile information handling system 505 by the second wireless speaker and microphone device 532 during establishment of Bluetooth® or BLE wireless link 506, and match the cloned pairing and wireless communication profile provided to the mobile information handling system 505 by the third wireless speaker and microphone device 534 during establishment of Bluetooth® or BLE wireless link 508. As a consequence, the first, second, and third wireless speaker and microphone devices (e.g., 531, 532, and 534) may be indistinguishable between Bluetooth® or BLE wireless links 501, 506, and 508 to the mobile information handling system 505 (e.g., smart phone) for the active audio data stream (e.g., call, meeting, or session). Thus, the third wireless speaker and microphone device 534 (e.g., laptop) may join the active audio data stream (e.g., call, meeting, or session) without requiring the user to instruct the mobile information handling system 505 to handoff the active audio data stream between two separate wireless speaker and microphone devices (e.g., 532 and 534) via a GUI at the mobile information handling system 505. In such a way, the Bluetooth® cloning and switching system operating at a plurality of wireless speaker and microphone devices in embodiments of the present disclosure may allow a user to seamlessly switch between these wireless speaker and microphone devices as the primary source of input/output during an active audio data stream, without interacting with a GUI of the mobile information handling system.

The second wireless speaker and microphone device in an embodiment may cease audio transmissions on the first wireless link at block 726. This is done in an embodiment so that the first wireless speaker and microphone device and the second wireless speaker and microphone device do not simultaneously transcieve audio data on the active audio data stream with the mobile information handling system. For example, the Bluetooth® cloning and switching system operating at the second wireless speaker and microphone device 532 (e.g., smart speaker) in embodiments may consequently cease transmitting audio input at the microphone of the second wireless speaker and microphone device 532 via wireless link 506 as part of the active audio data stream. The second wireless speaker and microphone device 532 (e.g., smart speaker) may also cease outputting speaker audio from the audio data stream received via wireless link 506 to the speaker of the second wireless speaker and microphone device 532. In such a way, the Bluetooth® cloning and switching system operating at a plurality of wireless speaker and microphone devices in embodiments of the present disclosure may allow a user to switch between these wireless speaker and microphone devices as the primary source of input/output during an active audio data stream, without interacting with a GUI of the mobile information handling system. The method for automatically and seamlessly handing off an active audio data stream with an information handling system from a second wireless speaker and microphone device to a third wireless speaker and microphone device in an embodiment may then end.

The blocks of the flow diagrams of FIGS. 6, 7A and 7B or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A first wireless speaker and microphone device paired with an information handling system comprising:
    a microphone and a speaker;
    a wireless speaker and microphone device radio system for conducting a first pairing via Bluetooth® with the information handling system for wireless communications, where a pairing and wireless communication profile of the information handling system for the first pairing are stored in a memory;
    a controller integrated circuit executing code instructions of a Bluetooth® cloning and switching system to operatively couple the first wireless speaker and microphone device to a second wireless speaker and microphone device via the speaker and microphone wireless radio system to conduct a second pairing between the first wireless speaker and microphone device and the second wireless speaker and microphone device;
    the controller integrated circuit to execute a pre-set procedure to clone the pairing and wireless communication profile and transmit the cloned pairing and wireless communication profile relating to the first pairing to the second wireless speaker and microphone device via the wireless speaker and microphone device radio system; and
    the controller integrated circuit to receive a switching command from the second wireless speaker and microphone device pursuant to user switch input received from a user, the switching command to stop an active audio transmission and reception by the first wireless speaker and microphone device with the information handling system and to allow the information handling system to communicate the active audio transmission and reception with the second wireless speaker and microphone device using a cloned Bluetooth® wireless link established with the cloned pairing and wireless communication profile.

2. The first wireless speaker and microphone device of claim 1, wherein the cloned Bluetooth® wireless link is a Bluetooth Low Energy (BLE) wireless link.

3. The first wireless speaker and microphone device of claim 1, wherein the second wireless speaker and microphone device is a smart speaker.

4. The first wireless speaker and microphone device of claim 1 further comprising:
    an earbud enclosing the speaker for insertion within an ear canal of the wearer.

5. The first wireless speaker and microphone device of claim 1 further comprising:
    a headphone enclosing the speaker for placement against an ear of the wearer.

6. The first wireless speaker and microphone device of claim 1 further comprising:

the active audio transmission and reception including a wireless call on the information handling system that is switched between the first wireless speaker and microphone device and the second wireless speaker and microphone device using the cloned pairing and wireless communication profile.

7. The first wireless speaker and microphone device of claim 1, where the cloned pairing and wireless communication profile includes pairing credentials of the first wireless speaker and microphone device with the information handling system under the Bluetooth protocol.

8. The first wireless speaker and microphone device of claim 1 further comprising:
the cloned pairing and wireless communication profile is transmitted to a third wireless speaker and microphone device; and
a second switching command from the third wireless speaker and microphone device is received at the second wireless speaker and microphone device after the information handling system is brought within pairing range of the third wireless speaker and microphone device and a second user switch input on the third wireless speaker and microphone device is received from the user.

9. A first wireless speaker and microphone device for executing code instructions of a Bluetooth® cloning and switching system comprising:
a microphone and a speaker;
a wireless speaker and microphone device radio system to conduct a first pairing with a second wireless speaker and microphone device that has previously paired with a mobile information handling system for wireless communications in a second pairing via Bluetooth® between the second wireless speaker and microphone device and the mobile information handling system;
the wireless speaker and microphone device radio system to receive a cloned pairing and wireless communication profile for the second pairing, where the cloned pairing and wireless communication profile for the second pairing is stored in a memory;
the wireless speaker and microphone device radio system to duplicate the second pairing with the mobile information handling system using the cloned pairing and wireless communication profile to establish a cloned, third wireless link via Bluetooth® for the first wireless speaker and microphone device in parallel to the Bluetooth® wireless link between the second wireless speaker and microphone device and the mobile information handling system pursuant to the second pairing;
the controller integrated circuit to receive a user switch input from a user;
the speaker and microphone wireless radio system to transmit a switching command to the second wireless speaker and microphone device, via the first pairing wireless link, to initiate switching audio transmission and reception to the first wireless speaker and microphone device by ceasing audio transmission and reception at the second wireless speaker and microphone device via Bluetooth® wireless link of the second pairing; and
the controller integrated circuit to initiate audio transmission and reception with the mobile information handling system using the cloned, third wireless link established with the cloned pairing and wireless communication profile.

10. The first wireless speaker and microphone device of claim 9, wherein the cloned third wireless link via Bluetooth® is a Bluetooth Low Energy (BLE) wireless link.

11. The first wireless speaker and microphone device of claim 9, where the cloned pairing and wireless communication profile includes pairing credentials of the second wireless speaker and microphone device with the information handling system under the Bluetooth® protocol.

12. The first wireless speaker and microphone device of claim 9 further comprising:
the cloned pairing and wireless communication profile is transmitted to a third wireless speaker and microphone device; and
a second switching command from the third wireless speaker and microphone device is received at the first wireless speaker and microphone device after the information handling system is brought within pairing range of the third wireless speaker and microphone device and a second switch instruction on the third wireless speaker and microphone device is received from the user.

13. The first wireless speaker and microphone device of claim 9 further comprising:
the controller integrated circuit to detect the mobile information handling system within pairing range of the first wireless speaker and microphone device before transmitting the switching command.

14. The first wireless speaker and microphone device of claim 9 further comprising:
the controller integrated circuit to receive an acknowledgement of the transmitted switching command before initiating audio transmission and reception with the mobile information handling system using the cloned, third wireless link established with the cloned pairing and wireless communication profile.

15. A method of executing cloning and switching of Bluetooth® pairing for an information handling system comprising:
executing a first pairing, via Bluetooth®, at a wireless radio of a first wireless speaker and microphone device, between the first wireless speaker and microphone device and the information handling system for wireless communications;
storing a pairing and wireless communication profile for the first pairing in a memory of the first wireless speaker and microphone device;
executing a second pairing, via the wireless radio of the first wireless speaker and microphone device, between the first wireless speaker and microphone device and a second wireless speaker and microphone device to transmit a cloned pairing and wireless communication profile of the stored pairing and wireless communication profile for the first pairing to pre-set the cloned pairing and wireless communication profile at the second wireless speaker and microphone device; and
receiving a switching signal command from the second wireless speaker and microphone device to stop an active audio transmission and reception on the first wireless speaker and microphone device upon the user switch input being received from a user at the second wireless speaker and microphone device, where the second wireless speaker and microphone device conducts the active audio transmission and reception with the information handling system using a cloned Bluetooth® wireless link established with the cloned pairing and wireless communication profile to duplicate the first pairing between the second wireless speaker and microphone device and the information handling system.

16. The method of claim 15, wherein receiving a switching signal command from the second wireless speaker and microphone device further occurs upon the information handling system being detected within pairing range of the second wireless speaker and microphone device.

17. The method of claim 15 further comprising:
transmitting an acknowledgement of receipt of the switching signal command to the second wireless speaker and microphone device.

18. The method of claim 15, wherein receiving a switching signal command from the second wireless speaker and microphone device seamlessly switches the active audio transmission and reception to the second wireless speaker and microphone device without interaction with the information handling system or interruption of the active audio transmission and reception with the information handling system.

19. The method of claim 15, wherein the cloned pairing and wireless communication profile includes pairing credentials of the first wireless speaker and microphone device with the information handling system under the Bluetooth® protocol.

20. The method of claim 15 further comprising:
transmitting the cloned pairing and wireless communication profile to a third wireless speaker and microphone device; and
receiving a second switching command from the third wireless speaker and microphone device at the second wireless speaker and microphone device after a second user switch input on the third wireless speaker and microphone device is received from the user at the third wireless speaker and microphone device.

* * * * *